(12) United States Patent
Ishikawa et al.

(10) Patent No.: US 8,884,570 B2
(45) Date of Patent: Nov. 11, 2014

(54) POSITION CONTROL SYSTEM

(71) Applicant: Olympus Corporation, Tokyo (JP)

(72) Inventors: Takashi Ishikawa, Tokyo (JP); Yukie Hashimoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/943,102

(22) Filed: Jul. 16, 2013

(65) Prior Publication Data

US 2013/0300336 A1  Nov. 14, 2013

Related U.S. Application Data

(63) Continuation of application No. PCT/JP2012/083402, filed on Dec. 25, 2012.

(30) Foreign Application Priority Data

Mar. 28, 2012 (JP) .................................. 2012-073252

(51) Int. Cl.
| | |
|---|---|
| *G05B 11/06* | (2006.01) |
| *G03B 5/00* | (2006.01) |
| *G03B 5/02* | (2006.01) |
| *H04N 5/225* | (2006.01) |
| *H02P 25/06* | (2006.01) |
| *H04N 5/232* | (2006.01) |
| *H02P 25/02* | (2006.01) |

(52) U.S. Cl.
CPC .. *G03B 5/02* (2013.01); *G03B 5/00* (2013.01); *G05B 11/06* (2013.01); *H04N 5/2253* (2013.01); *H02P 25/06* (2013.01); *H04N 5/23258* (2013.01); *H02P 25/028* (2013.01); *H04N 5/2328* (2013.01)
USPC ........ 318/560; 360/254.7; 360/75; 360/266.4

(58) Field of Classification Search
USPC ........................ 360/264.7, 75, 266.4; 318/560
See application file for complete search history.

(56) References Cited

U.S. PATENT DOCUMENTS

| | | | | |
|---|---|---|---|---|
| 6,208,109 | B1 * | 3/2001 | Yamai et al. | ................... 318/716 |
| 6,307,702 | B1 * | 10/2001 | Fukushi et al. | ................. 360/75 |
| 7,783,179 | B2 * | 8/2010 | Takahashi | ....................... 396/55 |

(Continued)

FOREIGN PATENT DOCUMENTS

| | | |
|---|---|---|
| JP | 11-064914 A | 3/1999 |
| JP | 2000-066258 A | 3/2000 |

(Continued)

OTHER PUBLICATIONS

International Search Report dated Jan. 29, 2013 issued in PCT/JP2012/083402.

*Primary Examiner* — Eduardo Colon Santana
*Assistant Examiner* — Bickey Dhakal
(74) *Attorney, Agent, or Firm* — Scully, Scott, Murphy & Presser, PC

(57) ABSTRACT

The invention provides a position control system comprising a moving portion that is movable, a position-detection portion that detects a position of the moving portion, a drive portion that applies driving force to the moving portion thereby moving the moving portion, a control portion that controls the driving force of the drive portion, and an input portion for inputting a drive target position for the moving portion, characterized in that the control portion is operable to determine the driving force to be applied to the drive portion based on a correction coefficient acquired based on a first deviation that is a difference between the drive target position inputted into the input portion and the reference position, and a second deviation that is a difference between a position detected by the position-detection portion and the drive target position inputted into said input portion.

14 Claims, 25 Drawing Sheets

(56) References Cited

U.S. PATENT DOCUMENTS

2007/0297055 A1* 12/2007 Enomoto et al. .............. 359/554
2011/0292226 A1    12/2011 Shimizu
2013/0063615 A1*  3/2013 Takeuchi ................... 348/208.5

FOREIGN PATENT DOCUMENTS

| | | |
|---|---|---|
| JP | 2006-227653 A | 8/2006 |
| JP | 2011-075834 A | 4/2011 |
| JP | 2011-115035 A | 6/2011 |

* cited by examiner

POSITION CONTROL SYSTEM

BACKGROUND OF THE INVENTION AND RELATED ART STATEMENT

The present invention relates generally to a position control system for applying driving force to a moving part for its movement.

So far, a digital camera includes an image shake corrector in which an imaging device or an optical element such as a lens is moved for the purpose of preventing image shakes at the time of imaging. When it comes to such an image shake corrector, a voice coil motor (VCM) has often been used as an actuator for moving the imaging device or optical element. Built up of a magnet portion and a coil, the voice coil motor is operated by energizing the coil to generate driving force proportional to a magnetic flux through the coil. The use of the voice coil motor enables fast and high-precision drive as well as size reductions.

JP(A) 2011-75834 (Patent Publication 1) discloses the use of a position detector with an image shake corrector using such a voice coil motor. In this position detector, there is a Hall element used that is capable of detecting changes in the magnetic flux generated from the magnet. Patent Publication 1 teaches that a moving frame is stably supported by taking into consideration the polarity location of the magnet used with the voice coil motor and a magnet used with the position detector.

SUMMARY OF THE INVENTION

One aspect of the invention to this end provides a position control system comprising:
a fixed portion,
a moving portion that is relatively movable with respect to said fixed portion,
a position-detection portion that detects a position of said moving portion with respect to a reference position of said fixed portion,
a drive portion that applies driving force to said moving portion thereby moving said moving portion,
a control portion that controls the driving force of said drive portion, and
an input portion for inputting a drive target position for said moving portion, wherein:
said control portion is operable to determine the driving force to be applied to said drive portion based on a correction coefficient acquired based on a first deviation that is a difference between the drive target position inputted into said input portion and said reference position, and a second deviation that is a difference between a position detected by said position-detection portion and the drive target position inputted into said input component.

Another aspect of the invention provides a position control system comprising:
a fixed portion,
a moving portion that is relatively movable with respect to said fixed portion,
a position-detection portion that detects a position of said moving portion with respect to a reference position of said fixed portion,
a drive portion that applies driving force to said moving portion thereby moving said moving portion,
a control portion that controls the driving force of said drive portion, and
an input portion for inputting a drive target position for said moving portion, wherein:
said control portion is operable to determine the driving force to be applied to said drive portion based on a correction coefficient acquired based on a first deviation that is a difference between a position detected by said position-detection portion and said reference position, and a second deviation that is a difference between the position detected by said position-detection portion and the drive target position inputted into said input portion.

DETAILED DESCRIPTION OF PREFERRED EMBODIMENTS

One embodiment of the invention will now be explained. The position control system of the invention will now be explained taking as an example an image shake corrector used on a digital camera or other imaging apparatus so as to take good enough images while the influences of vibrations such as hand shake are reduced.

Figure 1:
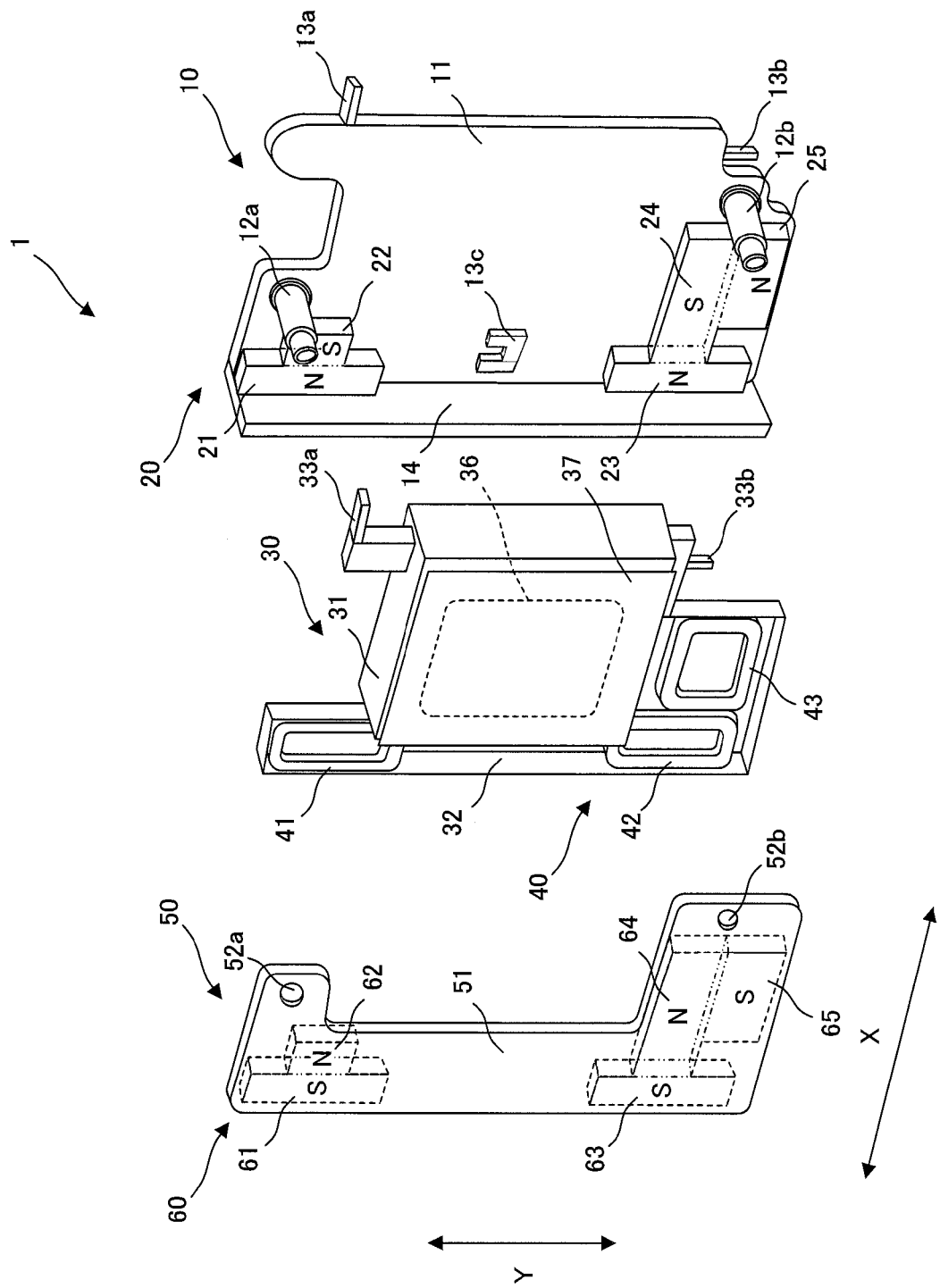
FIG. 1 is illustrative of the image shake corrector 1 before assembly according to one embodiment of the invention.

FIG. 1 is illustrative of the before-assembly image shake corrector 1 according to one embodiment of the invention. The image shake corrector 1 here comprises a fixed portion 10, a moving portion 30 that is movably supported on the fixed portion 10, and a magnet support portion 50 that is located in opposition to the fixed portion 10 with the moving portion 30 positioned between them and fixed to the fixed portion 10.

There is a first permanent magnet group 20 fixed to the fixed portion 10, and there is a second permanent magnet group 60 fixed to the magnet support portion 50. There is a coil group 40 fixed to the moving portion 30. The first 20 and the second magnet group 60 are positioned such that their oppositely magnetized portions are opposed to generate a magnetic field in the ensuing space. The coil group 40 is located in a space where the first 20 and the second permanent magnet group 60 are in opposition to each other. In FIG. 1, note that the magnetic poles of the first 20 and the second permanent magnet group 60 are found on the side of the coil group 40, as will apply to the subsequent figures.

Figure 2:
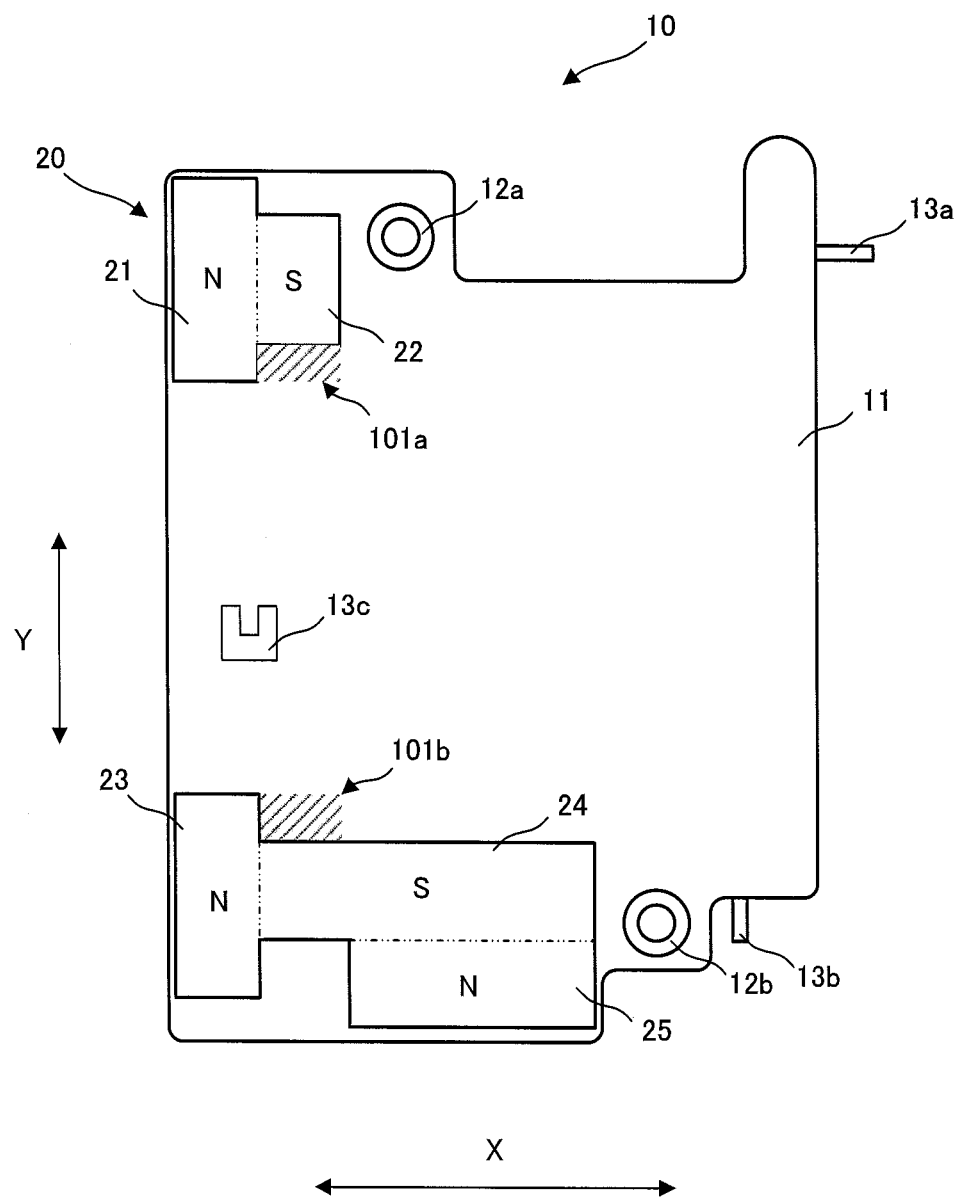
FIG. 2 is illustrative of the fixed portion 10.

FIG. 2 is illustrative of the fixed portion 10. The fixed portion 10 comprises a fixed body 11 that is formed of a magnetic material such as iron, and an iron compound in a flat-sheet configuration, support through-holes 12a and 12b for receiving screws (not shown) adapted to be provided through the fixed body 11 to support the magnet support portion 50 with respect to the fixed portion 10, and a first group of spring supports 13a, 13b and 13c for supporting springs (not shown) adapted to support the moving portion 30 with respect to the fixed portion 10 in a movable fashion.

Referring here to the fixed portion 10, the X-direction is defined as the first direction and the Y-direction is defined as the second direction orthogonal to the X-direction, as depicted in FIG. 2.

The first permanent magnet group 20 in the fixed portion 10 comprises a first magnet portion 21 N-polarized on the side of the coil group 40, a second magnet portion 22 that stands opposite to the first magnet portion 21 in the X-direction and S-polarized on the side of the coil group 40, a third magnet portion 23 that is located away from the first magnet portion 21 in the Y-direction and N-polarized on the side of the coil group 40, a fourth magnet portion 24 that stands opposite to the third magnet portion 23 in the X-direction and S-polarized on the side of the coil group 40, and a firth magnet portion 25 that stands opposite to the fourth magnet portion 24 in the Y-direction and N-polarized on the side of the coil group 40. Note here that the first 21 to the fifth magnet portion 25 are oppositely magnetized on the side of the coil group 40 and on the opposite side.

The fourth magnet portion 24 side in the Y-direction of the second magnet portion 22 is made shorter than the first magnet portion 21 so that there is a first space 101a left as a cutout that does not stand opposite to the first magnet portion 21, and the second magnet portion 22 side of the Y-direction of the fourth magnet portion 24 is made shorter than the third magnet portion 23 so that there is a second space 101b left as a cutout that does not stand opposite to the third magnet portion 23.

Figure 3:
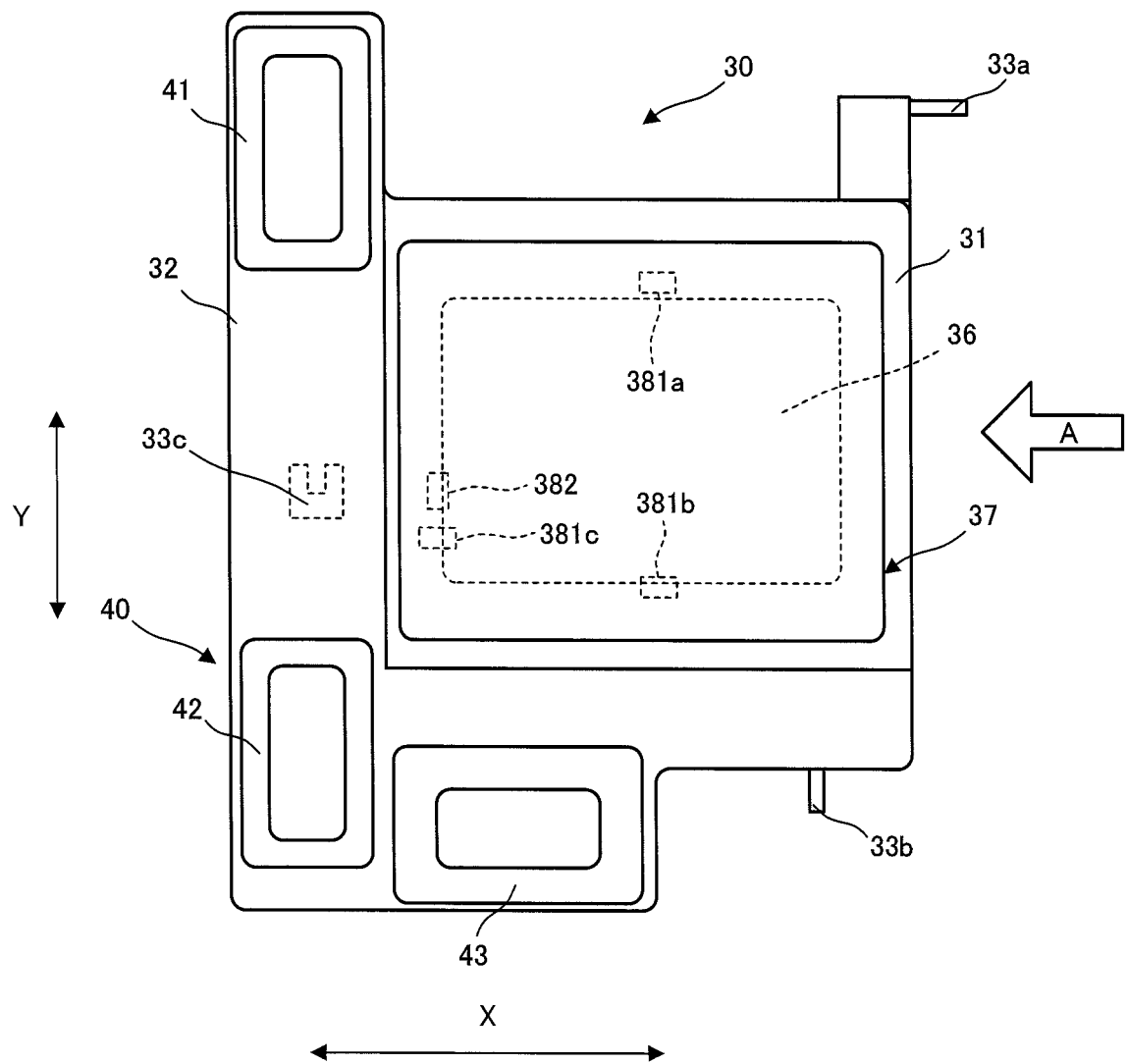
FIG. 3 is illustrative of the moving portion 30.
Figure 4:
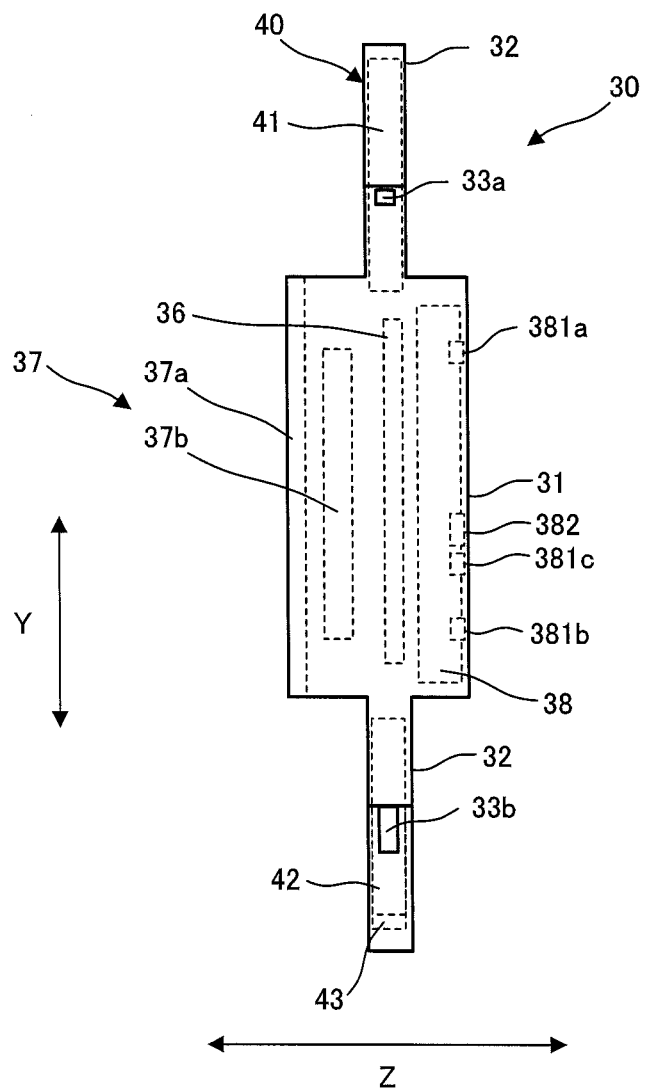
FIG. 4 is a view of FIG. 3 as viewed from the action arrow A.

FIG. 3 is illustrative of the moving portion 30, and FIG. 4 is a view of FIG. 3 as viewed from the action arrow A. The moving portion 30 comprises a moving body 31 formed of a nonmagnetic material such as an aluminum alloy, and a synthetic resin, a coil housing 32 provided on a part of the periphery of the moving body 31, and a second group of spring supports 33a, 33b and 33c for supporting springs (not shown) adapted to support the moving portion 30 with respect to the fixed portion 10 in a movable fashion.

Referring here to the moving portion 30, the X-direction is defined as the first direction and the Y-direction is defined as the second direction orthogonal to the X-direction, as depicted in FIG. 3.

The moving portion 31 has a photoelectric imaging device 36, a filter group 37 and an electric device 38. The filter group 37 comprises, from its side away from the imaging device 36, an ultrasonic filter 37a and an infrared cut filter 37b. On the side of the filter group 37 opposite to the imaging device 36 there is the electric device 36 mounted that is capable of detecting the quantity of light received at the imaging device to process image signals, etc. based on that quantity of light received.

As depicted in FIGS. 3 and 4, the moving portion 30 is provided as one arrangement of the electric device 38 with Hall elements 381a, 381b and 381c for detecting its relative position with respect to the fixed portion 10. The Hall elements 381a, 381b and 381c are sensors that produces out signals in association with a magnetic field in a moving position; in this embodiment, the relative positions of the moving portion 30 in the X- and Y-directions are detected based on the outputs from the three Hall elements 381a, 381b and 381c. Note here that on the fixed portion 10 side, there is a magnet portion (not shown) provided to generate a magnetic field detected by the Hall elements 381a, 381b and 381c. The electric device 38 is constructed of, and includes, a temperature sensor 382. The temperature measured by the temperature sensor 382 is used for compensating for changes in the outputs from the Hall elements 381a, 381b and 381c, etc. caused by temperature changes.

The coil housing 32 is provided at a part of the periphery of the moving body 31 to house the coil group 40 in its recess. The moving body 31 is longer than the coil housing 32 in the Z-direction orthogonal to the X- and Y-directions.

The coil group 40 includes a first coil 41, a second coil 42 and a third coil 43. The first coil 41 is located in opposition to the first 21 and the second magnet portion 22 in the fixed portion 10 depicted in FIG. 2. The second coil 42 is located in opposition to the third 23 and the fourth magnet portion 24 in the fixed portion 10 depicted in FIG. 2. The third coil 43 is located in opposition to the fourth 24 and the fifth magnet portion 25 in the fixed portion 10 depicted in FIG. 2.

Figure 5:
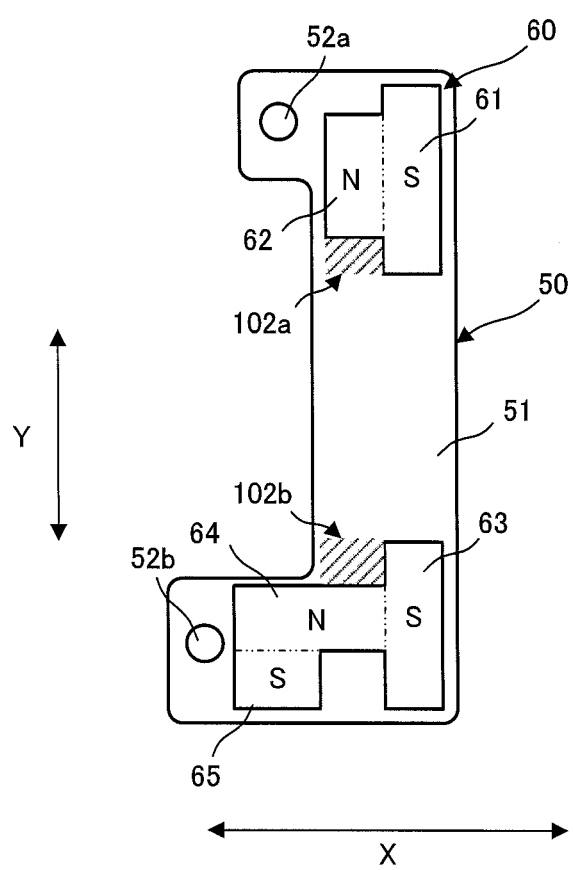
FIG. 5 is illustrative of the magnet support portion 50.

FIG. 5 is illustrative of the magnet support portion 50. However, FIG. 5 is a view of the magnet support portion 50 of FIG. 1 as viewed from the side of the moving portion 30.

The magnet support portion 50 comprises a support body 51 that is formed of a magnetic material such as iron, and an iron compound in a flat-sheet configuration, and through-holes 52a and 52b that are provided through the support body 51 to receive screws (not shown) for supporting the magnet support portion 50 with respect to the fixed portion 10.

Referring here to the magnet support portion 50, the X-direction is defined as the first direction and the Y-direction is defined as the second direction orthogonal to the X-direction, as depicted in FIG. 5.

The second permanent magnet group 60 in the magnet support portion 50 comprises a first opposite magnet portion 61 S-polarized on the side of the coil group 40, a second opposite magnet portion 62 that stands opposite to the first opposite magnet portion 61 in the X-direction and is N-polarized on the side of the coil 40, a third opposite magnet portion 63 that is located away from the first opposite magnet portion 61 in the Y-direction and S-polarized on the side of the coil group 40, a fourth opposite magnet portion 64 that stands opposite to the third opposite magnet portion 63 in the X-direction and N-polarized on the side of the coil group 40, and a fifth opposite magnet portion 65 that stands opposite to the fourth magnet portion 64 in the Y-direction and S-polarized on the side of the coil group 40. Note here that the first 61 to the fifth opposite magnet portion 65 are oppositely polarized on the side of the coil group 40 and the opposite side, respectively.

The fourth opposite magnet portion 64 side in the Y-direction of the second opposite magnet portion 62 is made shorter than the first opposite magnet portion 61 due to the presence of a notch that defines a third space 102a that does not stand opposite to the first opposite magnet portion 61. The second opposite magnet portion 62 side in the Y-direction of the fourth opposite magnet portion 64 is made shorter than the third opposite magnet portion 63, with a fourth space 102b as a notch that does not stand opposite to the third opposite magnet portion 63.

Figure 6:
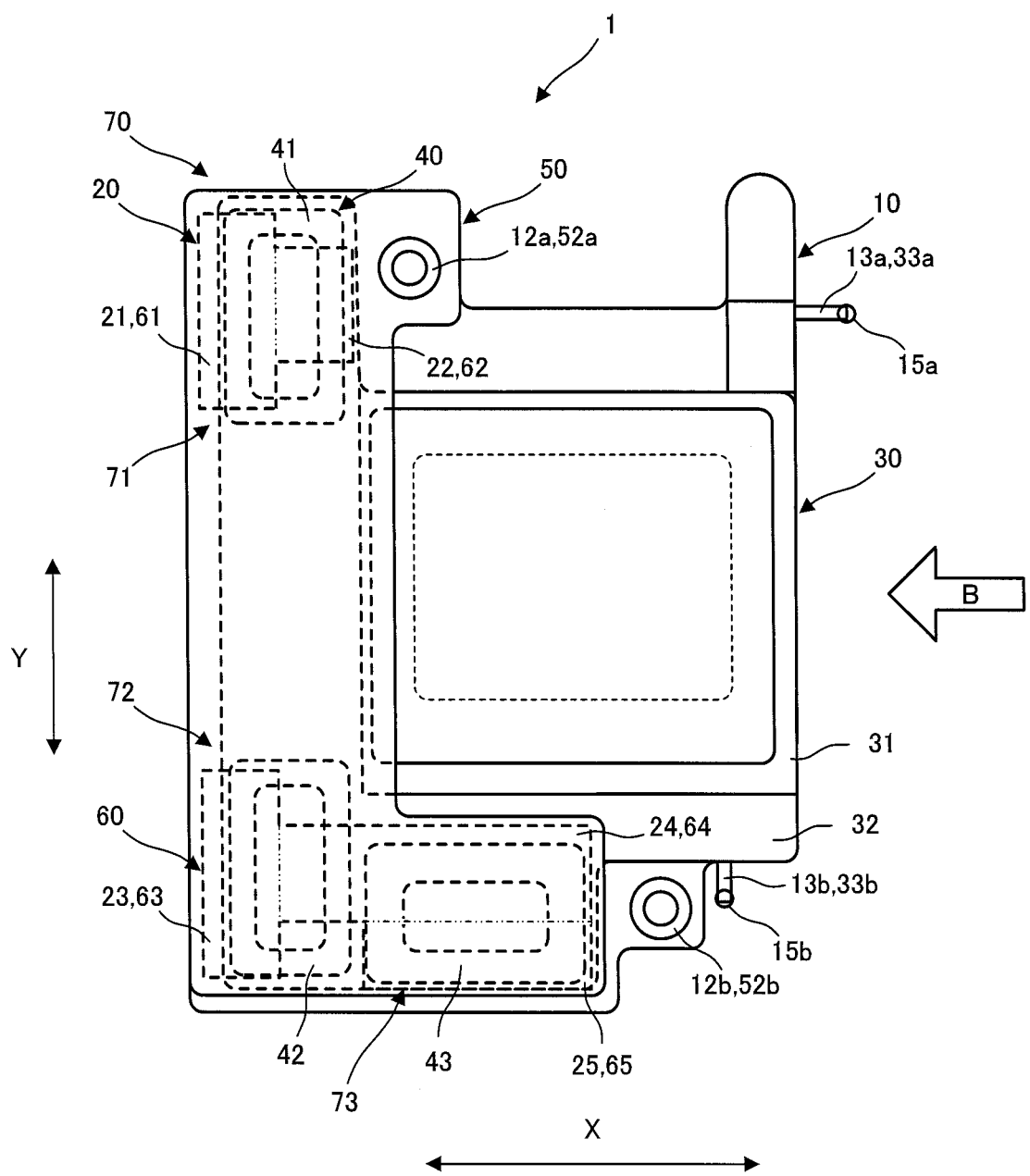
FIG. 6 is illustrative of the image shake corrector 1 after assembly according to one embodiment of the invention.
Figure 7:
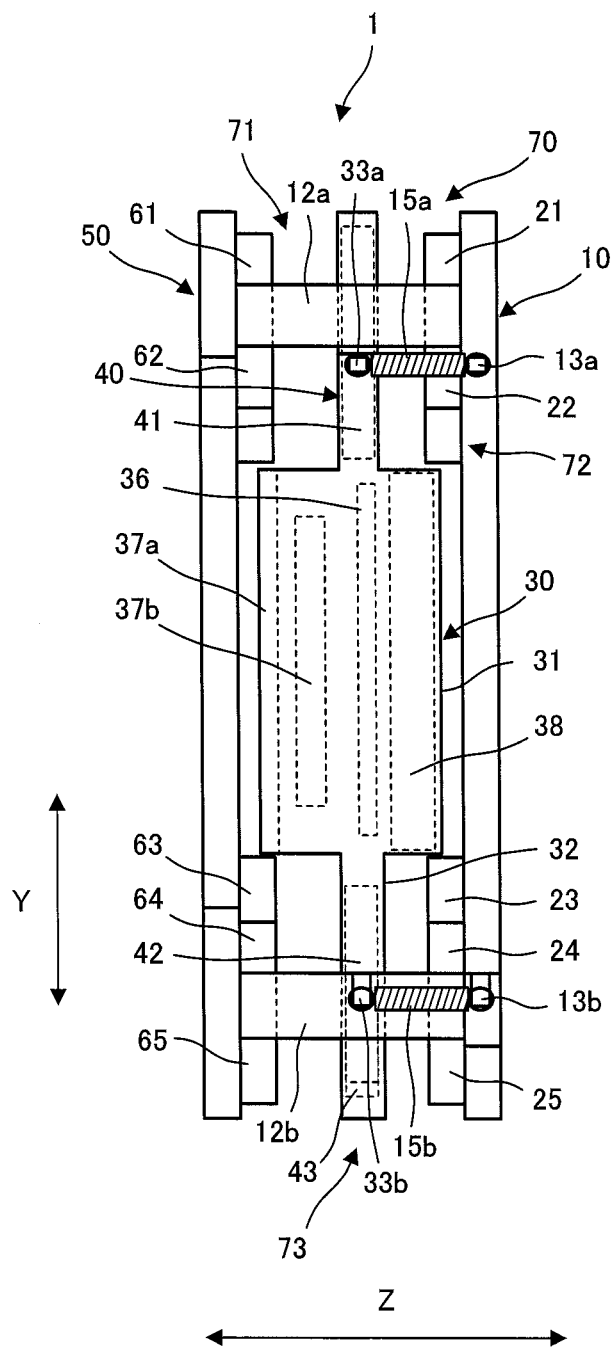
FIG. 7 is a view of FIG. 6 as viewed from the action arrow B.

FIG. 6 is illustrative of the image shake corrector 1 after assembly according to one embodiment of the invention, and FIG. 7 is a view of FIG. 6 as viewed from the direction of the action arrow B.

For the assembly of the image shake corrector 1 according to this embodiment, screws (not shown) are inserted through the support through-holes 12a and 12b and the threaded through-holes 52a and 52b through the fixed portion 10 depicted in FIG. 1, and the support body 51 of the magnet support portion 50 is supported by a plate 14 attached to the fixed body 11 of the fixed portion 10. Accordingly, the support body 51 will be firmly fixed to the fixed body 11 at three sites: the support through-holes 12a and 12b and the plate 14. Further, the first group of spring supports 13a, 13b and 13c in the fixed portion 10 is connected with the second group of spring supports 33a, 33b and 33c in the moving portion 30 by coiled springs 15a, 15b and 15c. That connection of the fixed portion 10 with the moving portion 30 by the coiled springs 15a, 15b and 15c will enable relative movement of the moving portion 30 with respect to the fixed portion 10.

Alternatively, the fixed portion 10 and moving portion 30 may be supported by means of a ball or balls thereby making sure smooth movement of the moving portion 30. Support-by-ball is an embodiment of supporting the moving portion with respect to the fixed portion by means of one or plural spherical balls thereby making sure smooth movement of the moving portion by the rotation of the balls. When the support-by-ball is applied to this embodiment of the invention, it is possible to interpose the ball or balls between the fixed portion 10 and the moving portion 30 thereby making sure smooth movement of the moving portion 30.

At the time of assembling the image shake corrector 1, the first permanent magnet group 10 in the fixed portion 10 stands away from and opposite to the second permanent magnet group 60 in the magnet support 50. The opposite magnet portions in the first 20 and the second permanent magnet group 60 are oppositely polarized, respectively, so that the space between the respective magnets has its own magnetic field generated in it. The coil group 40 is located in the discrete spaces each having its own magnetic field. The first 20 and the second permanent magnet group 60 and the coil group 40 are located in this way, providing a voice coil motor 70.

In this embodiment of the invention, the first and second magnet portions 21 and 22, the first coil 41 and the first and second opposite magnets 61 and 62 cooperate together, providing a first X-direction voice coil motor 71 that moves the moving portion 30 in the X-direction defined as the first direction. Likewise, the third and forth magnet portions 23 and 24, the second coil 42 and the third and fourth opposite magnet portions 63 and 64 cooperate together, providing a second X-direction voice coil motor 72 that moves the moving portion 30 in the X-direction defined as the first direction. In addition, the fourth and fifth magnet portions 24 and 25, the third coil 43 and the fourth and fifth opposite magnet portions 64 and 65 cooperate together, providing a Y-direction voice coil motor 73 that moves the moving portion 30 in the Y-direction defined as the second direction.

In this embodiment of the invention, the fourth magnet portion 24 and the fourth opposite magnet portion 64 are shared by the second X-direction voice coil motor 72 and the Y-direction voice coil motor 73. Thus, the sharing of the magnet portions and the opposite magnet portions between a plurality of voice coil motors helps reduce the parts count and location area.

In this embodiment of the invention, as currents pass through the first and second coils 41 and 42, it causes movement of the moving portion 30 in the X-direction, and as currents pass through the third coil 43, it causes movement of the moving portion 30 in the Y-direction.

Figure 8:
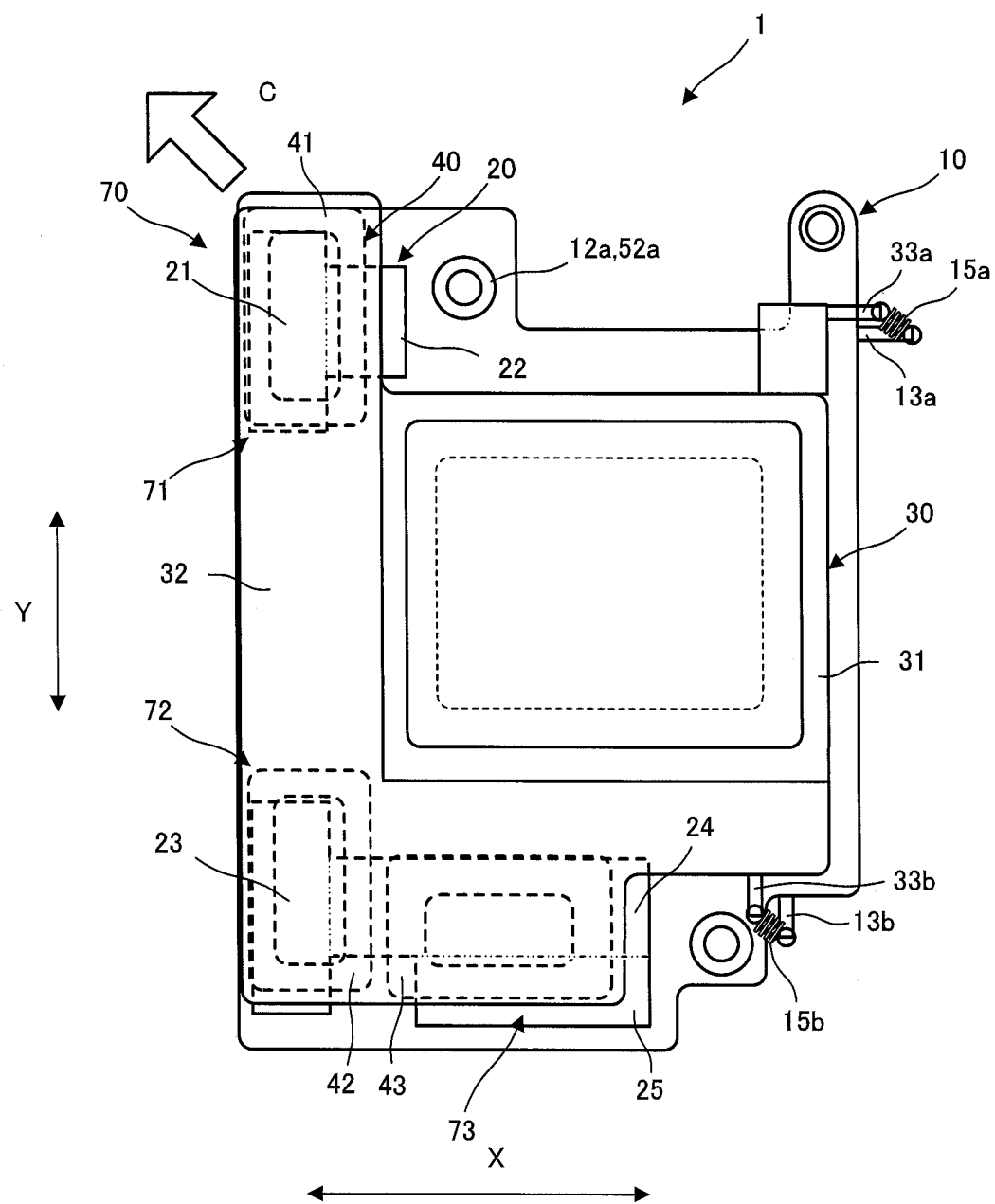
FIG. 8 is illustrative of the operation of the image shake corrector 1 after assembly according to one embodiment of the invention.
Figure 9:
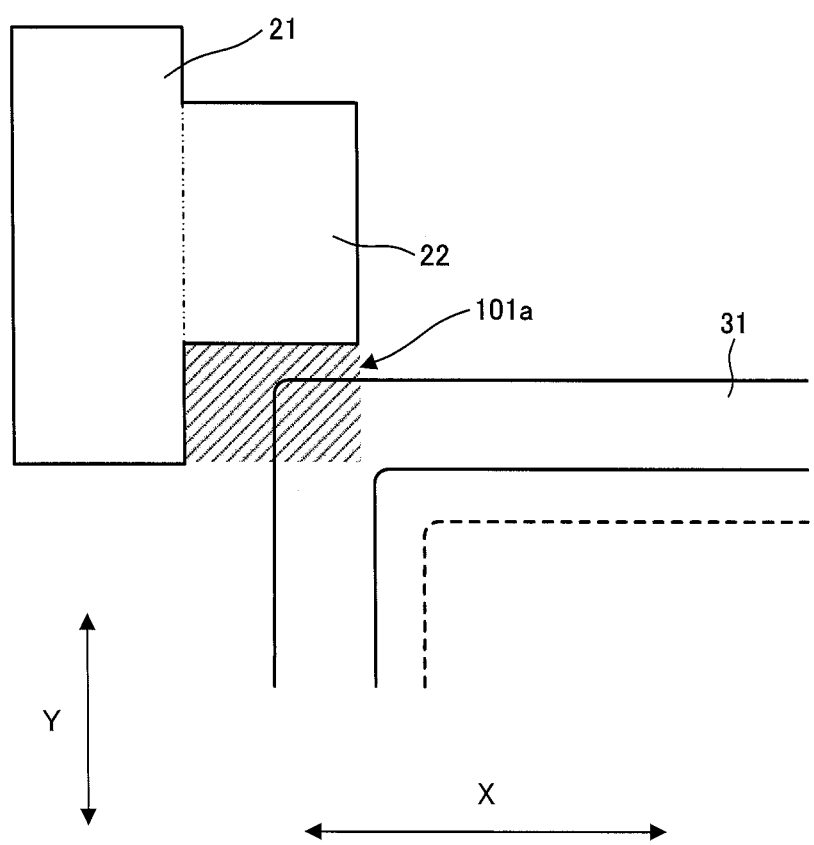
FIG. 9 is an enlarged view of a part of FIG. 8.

FIG. 8 is illustrative of the operation of the image shake corrector 1 after assembly according to one embodiment of the invention, and FIG. 9 is an enlarged view of a part of FIG. 8. Note here that the magnet support 50 is left out from FIG. 8 so as to make the movement of the moving portion 30 more visible, and the first and second magnet portions 21 and 22 and the moving body 31 are only shown in FIG. 9.

As shown typically in FIG. 8, suppose now that the moving portion 30 moves with respect to the fixed portion 10 in a direction indicated by the action arrow C. Then, the moving body 31 draws in the direction of the first and second magnet portions 21 and 22, as shown in FIG. 9. If the Y-direction length of the second magnet portion 22 is the same as the Y-direction length of the first magnet portion 21, the moving body 31 will interfere with (contact) the second magnet portion 22.

In this embodiment of the invention, accordingly, the first and second magnet portions 21 and 22 are made so asymmetric in size that there can be an extension of the range of movement of the moving portion 30. Specifically, the Y-direction length of the second magnet portion 22 is made shorter than the Y-direction length of the first magnet portion 21, providing a first space 101a for movement of the moving portion 30. Thus, if the first and second magnet portions 21 and 22 are made asymmetric in size to provide the first space 101a, it is then possible to avoid interference of the moving body 31 with the second magnet portion 22 and allow for size reductions of the system.

In this embodiment of the invention, other magnet portion may be made asymmetric in configuration too, providing a space that allows for movement of the moving portion 30. In turn, this may help avoid interference of the moving body 31 with the associated magnet portion or the magnet portion with other member, thereby achieving size reductions of the system without rendering the range of movement of the moving portion 30 narrow.

While this embodiment of the invention has been described with reference to the arrangement having permanent magnet groups in both the fixed portion 10 and the magnet support 50, it is to be understood that when there is an output that enables operation of the moving portion 30, the permanent magnet groups may be provided in only one of the fixed portion 10 and the magnet support 50.

Figure 10:
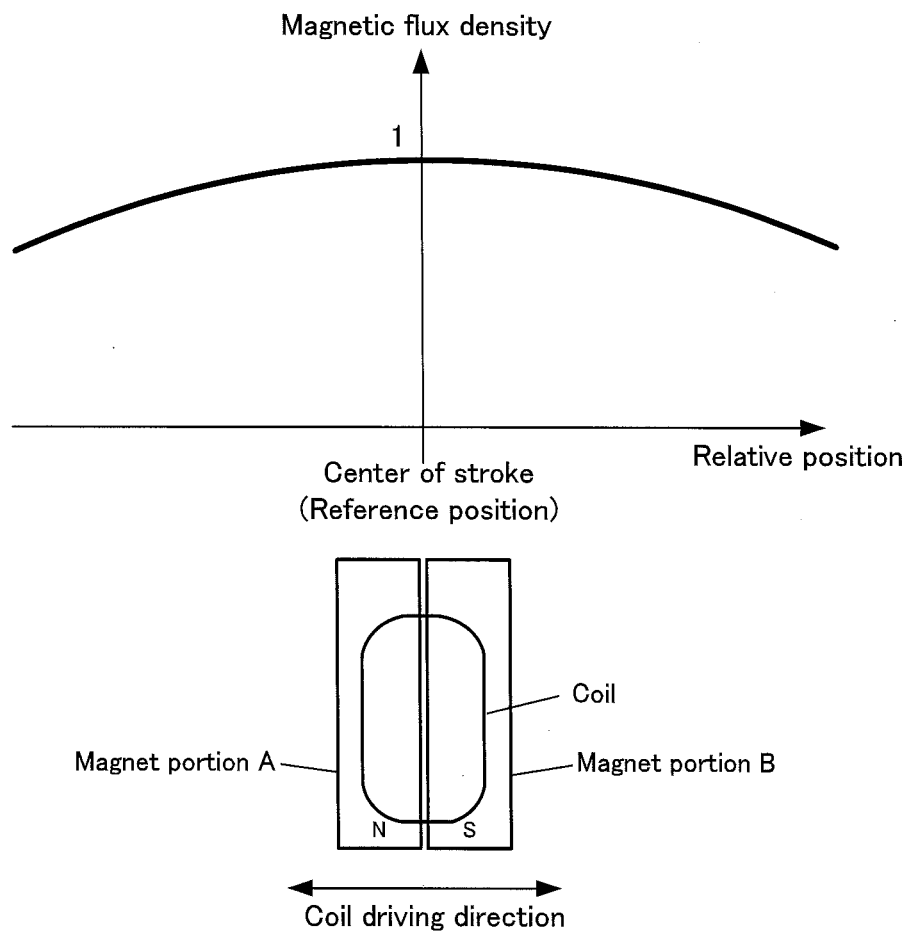
FIG. 10 is indicative of magnetic flux densities in association with the movement of the coil (with the magnet portions being symmetrically located).

How to control driving force according to one embodiment of the invention will then be explained. FIG. 10 is illustrative of magnetic flux densities in association with movement of the coil. For an easy understanding of this embodiment, reference is here made to a simple arrangement wherein magnets A and B are located symmetrically about the center of stroke of the moving portion (with the reference position defined by the stationary position of the moving portion). Then suppose that the moving portion having the coil mounted on it is moved one dimensionally in the left-and-right direction alone.

Figure 11:
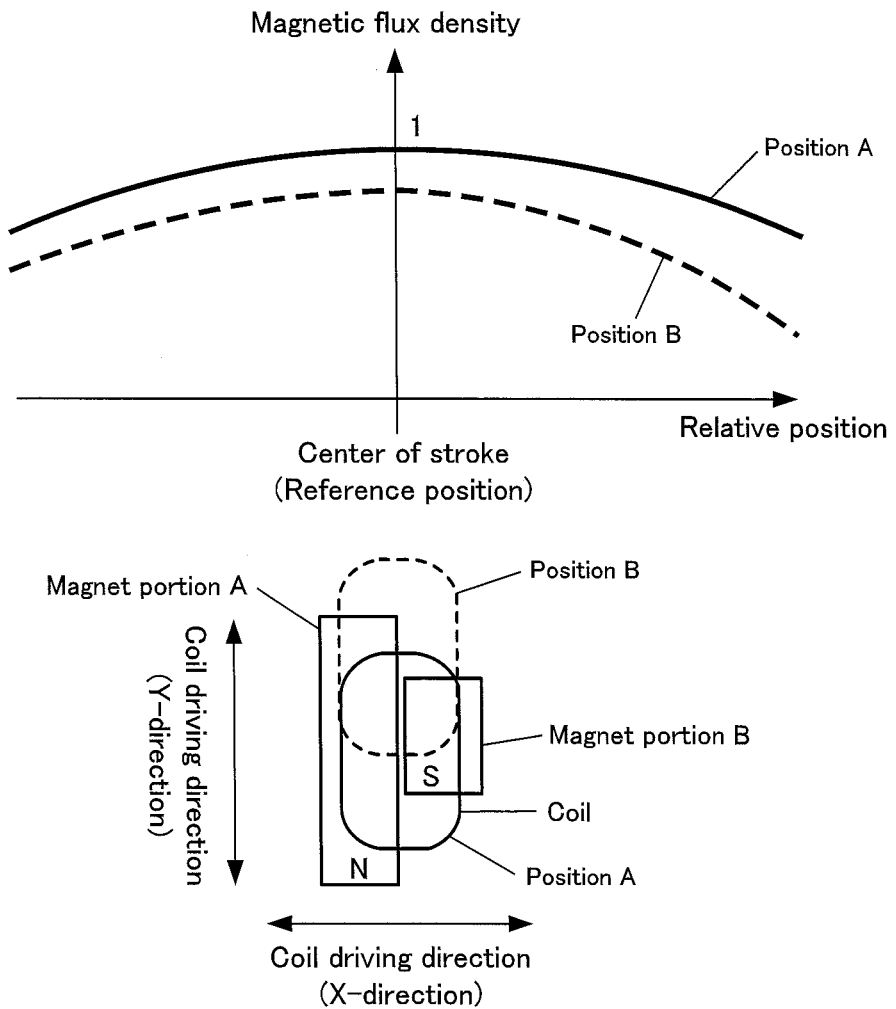
FIG. 11 is indicative of magnetic flux densities in association with the movement of the coil (with the magnet portions being asymmetrically located).
Figure 16:
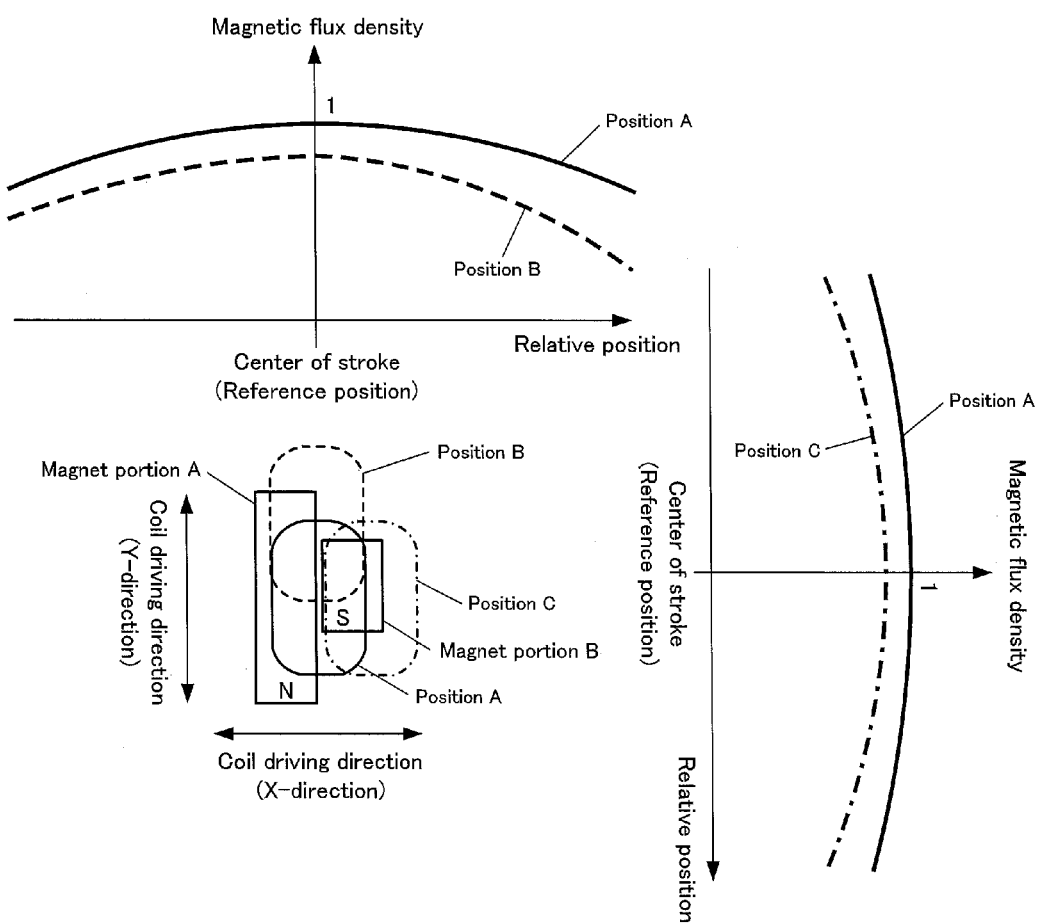
FIG. 16 is indicative of magnetic flux densities in association with the movement of the coil (with the magnet portions being asymmetrically located).

Now that the image shake corrector needs to be reduced in size as described above, one possible approach may be to reduce magnet portion size. FIG. 10 presents a schematic view showing the coil and the magnet portions A and B, along with a graph indicative of the relation of a magnetic flux density that the coil receives upon relative movement of the coil to the magnet portions A and B. Note here that the relative position in the schematic view is enlarged in the relative position on the graph. In FIGS. 11 and 16 given later, too, the relative one direction is enlarged on the graphs.

Given that the magnet portions A and B used are small, the magnetic flux density defined by them will go beyond a uniform range to move the coil. For this reason, as the coil goes away from the center of stroke as shown in the graph of FIG. 10, there will be a sharp drop of the magnetic flux density that the coil receives. When currents passing through the coil in positions near and away from the center of stroke are equally controlled, therefore, energizing force will go weaker in the vicinity of the position away from the center of stroke.

When there is an attempt to reduce the size of the voice coil motor by asymmetric location of the magnet portions as explained with reference to FIG. 1, left and right energizing forces may possibly be thrown off-balance. FIG. 11 is illustrative of the magnetic flux densities in association with movement of the coil. In FIG. 11 there is the voice coil motor schematically shown in which the magnet portions are asymmetrically located. As shown, the magnet portions A and B are located asymmetrically about the center of stroke. In this example, the magnet portion A is made longer than the magnet portion B in the Y-direction. The graph is indicative of a magnetic flux density that the coil receives upon X-direction (lateral) movement of the coil to the coil magnet portions A and B.

In the graph, the magnetic flux density upon movement of the coil in the X-direction from the center (position A) of stroke in the Y-direction is indicated by a solid line. It is seen that in either of the left and right directions of movement, there is an equal (symmetric) decrease in the magnetic flux density. In the graph, the magnetic flux density upon displacement of the coil in the Y-direction is also indicated by a dotted line. When there is X-direction movement of the coil from the position B, the magnetic flux density is thrown horizontally off balance for the reason that the magnet portions A and B are asymmetrically located. When there is movement of the coil from the position B in the left and right directions, therefore, there is less driving force in the left position than in the right position, which will throw the driving force off balance in the left-and-right direction.

Thus, the image shake corrector according to this embodiment of the invention makes up for the decrease in the driving force in the position away from the reference position, which decrease is caused by the size reduction of the magnet portions explained with reference to FIG. 10, and provides a solution to an imbalance problem with the driving force caused by the asymmetric location of the magnet portions explained with reference to FIG. 11, resulting in improvements in the ability to follow position control. Not only the size reductions and asymmetric location of the magnet portions but also other factors contribute to decreased and imbalanced driving force.

Figure 12:
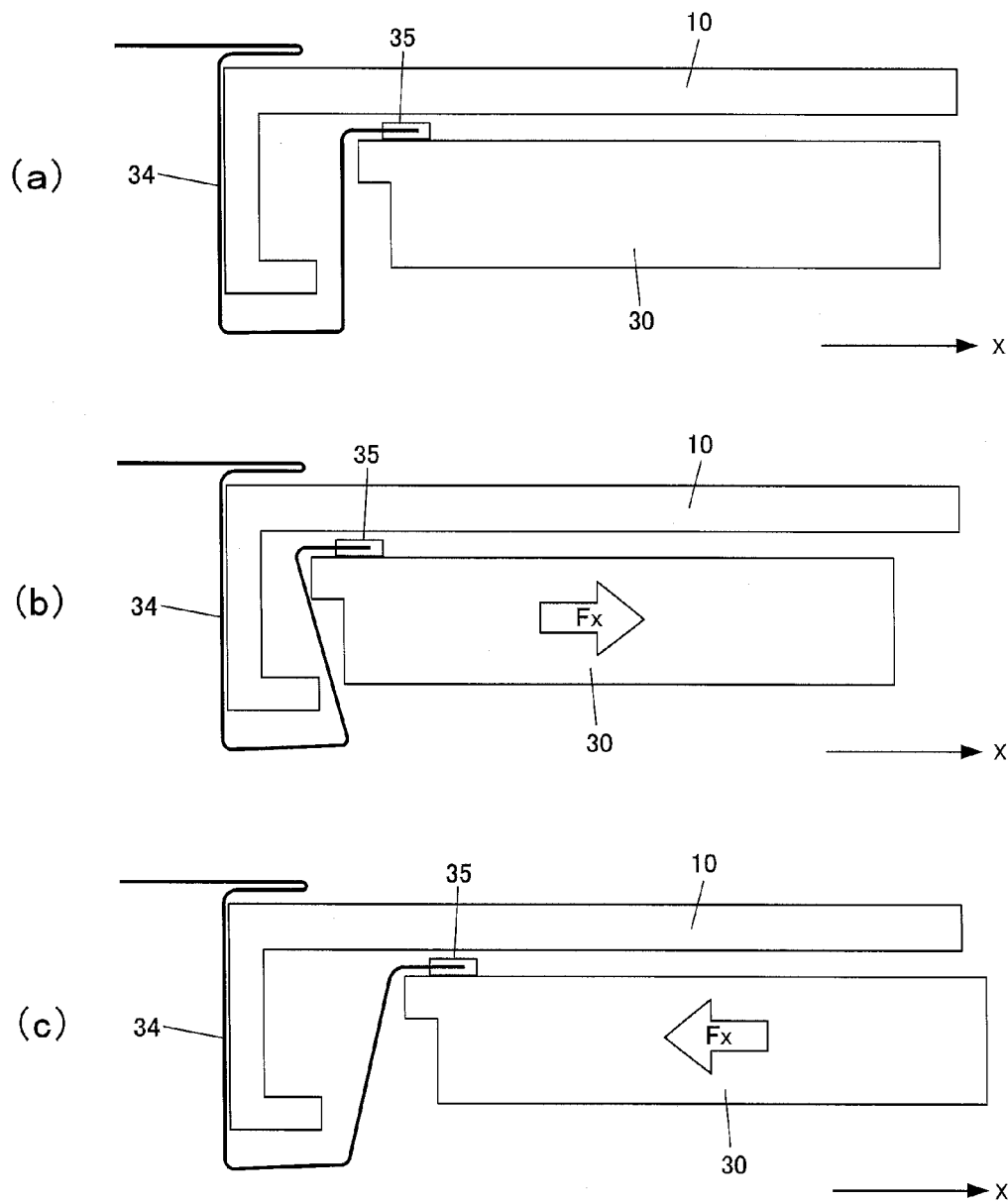
FIG. 12 is illustrative of the energizing force by a flexible cable.

FIG. 12 is illustrative of the energizing force by a flexible cable. As explained typically with reference to FIGS. 1 and 3, the moving portion 30 must allow power and signals to be fed to the imaging device 36, the electric device 38, etc. and received by them. To this end the moving portion 30 is connected to the fixed portion 10 by way of a flexible cable 34. FIG. 12(a) shows a state of the moving portion 30 upon positioned in the reference position. The moving portion 30 is provided with a connector 35 for the connection of the flexible cable 34. The connector 35 is connected with the flexible cable 34 for connection to a control portion, a power source, etc. mounted on the side of the fixed portion 10.

In the image shake corrector 1, on the other hand, the moving portion 30 is supposed to move with respect to the fixed portion 10. FIGS. 12(b) and 12(c) show states of movement of the moving portion 30. FIG. 12(b) shows that the moving portion 30 moves leftward, with an energizing force Fx acting rightward by the flexible cable 34, and FIG. 12(c) shows that the moving portion 30 moves rightward, with the energizing force Fx acting leftward by the flexible cable 34. It is then expected that such energizing force Fx fluctuates depending on the position of movement of the moving portion 30, and the magnitude of the energizing force Fx with respect to the position of movement fluctuates nonlinearly depending on a variety of conditions such as the specifications, location, etc. of the flexible cable 34. With the image shake corrector 1 according to this embodiment of the invention, it is intended to make improvements in the ability to follow position control by the application of the driving force with the energizing force Fx created by such flexible cable 34 in mind.

Figure 13:
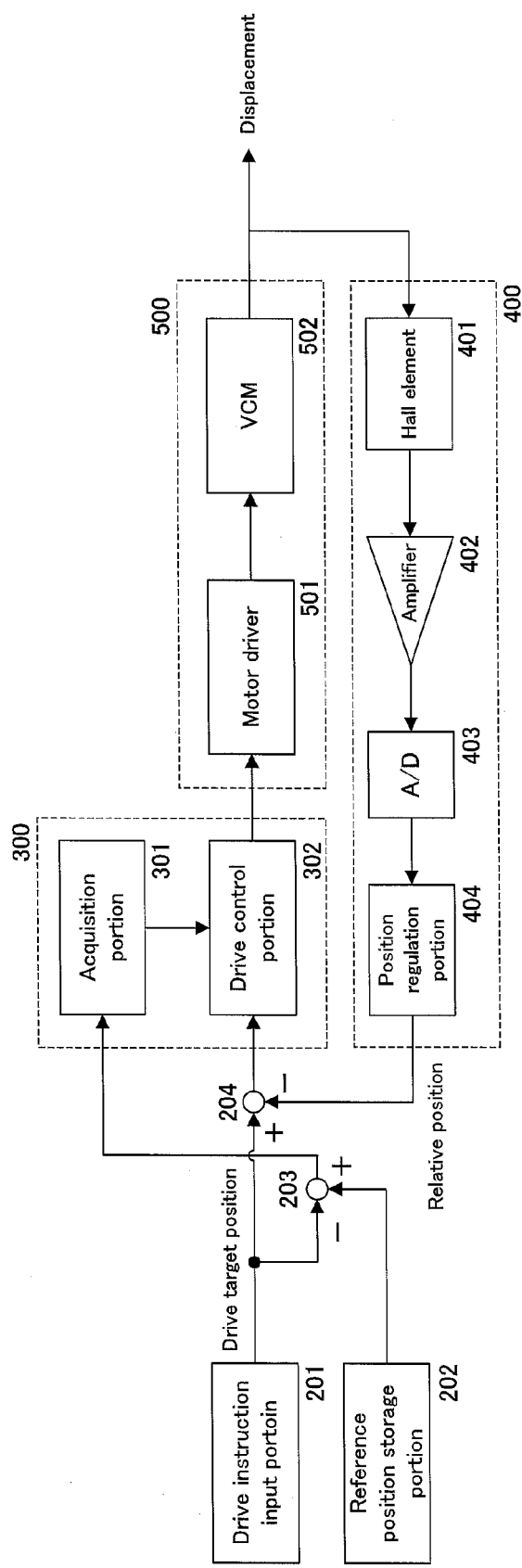
FIG. 13 is a block diagram of the control setup of the image shake corrector (uniaxial control).

FIG. 13 is a block diagram illustrative of the control setup of the image shake corrector 1. For an easy understanding of the explanation here, suppose now that the control setup is a uniaxial one for driving the coil in one direction alone as explained with reference to FIG. 10. Based on an output value from, for instance, a gyro-sensor built in an imaging apparatus body, a drive target position is entered in a drive support input portion 201, and the center of stroke, viz., the position (reference position) where there is none of the driving force applied to the coil is stored in a reference position storage portion 202.

In this embodiment of the invention, a position detection portion 400 is made up of a Hall element 401, an amplifier 402, an A/D (AD converter) 403 and a position adjuster portion 404. The Hall element 401 is a position detection sensor mounted on the side of the moving portion 30 as explained with reference to FIGS. 3 and 4 to generate a signal depending on the magnetic field in the position of movement. The signal produced out of the Hall element 401 is amplified in the amplifier 404 and then converted by the A/D 403 into a digital signal. The digital signal produced out of the A/D 403 is converted in the position adjuster portion 404 into a relative position of the moving portion 30 with respect to the fixed portion 10, and produced out from there. In this embodiment of the invention wherein the ordinary position detection range of the Hall element 401 is exceeded, the position adjuster portion 404 is used to run correction operation to figure out the relative position.

An operation portion 204 is operable to provide a deviation of the relative position from the drive target position (hereinafter called the second deviation) to a control portion 300. On the other hand, an operation portion 203 is operable to provide a deviation of the drive target position from the reference position (hereinafter called the first deviation) to the control portion 300. The control portion 300 is operable to control a drive portion 500 based on such entered deviations. The drive portion 500 is built up of a motor driver 501 and a VCM (voice coil motor) 502. The motor driver 501 is controlled on the basis of a signal indicative of a driving force produced out of the control portion 300 to drive the VCM 502. The position of the moving portion 30 moved by the driven VCM 502 is detected by the Hall element 401 so that it can again be used for the driving of the VCM 502.

In the image shake corrector 1 according to this embodiment of the invention such feedback control may be implemented to drive the VCM 502 thereby moving the moving portion 30 to the drive target position. A specific control operation of the control portion 300 is now explained. The control portion 300 is built up of, and includes, an acquisition portion 301 and a drive control portion 302. Basically, the drive control portion 302 uses the second deviation operated by the operation portion 204 to control the motor driver 501 while the driving force is corrected by a correction coefficient acquired by the acquisition portion 301. The acquisition portion 301 is operable to acquire the correction coefficient based on the first deviation figured out by the operation portion 203 to provide it to the drive control portion 302.

Figure 14:
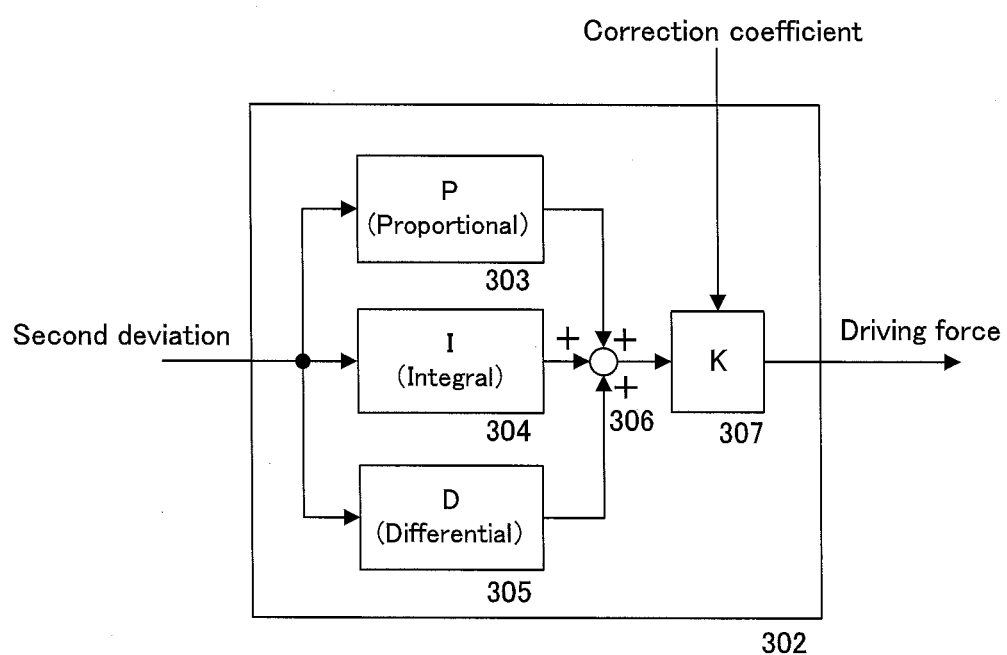
FIG. 14 is a block diagram of the control setup of the control portion 300.

FIG. 14 is illustrative of the control setup of the drive control portion 302. In this embodiment of the invention use is made of PID control used in a feedback control mode. Basically, this PID control comprises proportional operation 303 for producing out a value proportional to the entered deviation, integral operation 304 for producing out a value obtained by integrating the deviation with respect to time, and differential operation 305 for producing out a value obtained by differentiating the deviation with respect to time. Outputs from these operations are operated in an operation portion 306 to find the driving force while a value produced out of the operation portion 306 is corrected by the correction coefficient in a correction portion 307. This correction operation is implemented for reducing driving force decreases caused by the aforesaid size reductions and asymmetric locations of the magnet portions, the energizing force by the flexible cable 34, etc.

Figure 15:
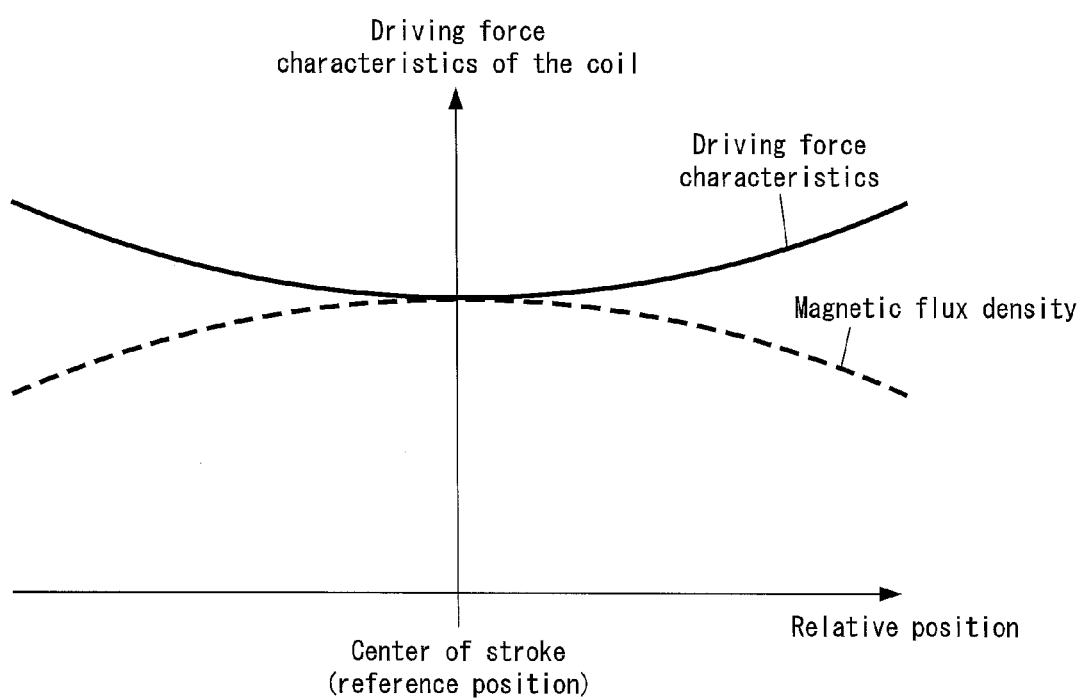
FIG. 15 is illustrative of the coil s driving force characteristics.

FIG. 15 is indicative of the driving force characteristics of the coil as well as magnetic flux density changes in association with the magnet portions in FIG. 10. When the small magnet portions are used as described above, there is a noticeable magnetic flux density decrease as the moving portion 30 moves away from the center of stroke. When the same control (with the same current) is applied to the vicinity of the center of stroke and a peripheral position away from the center of stroke, there will be a difference in the driving force acting on the coil. In other words, even with the same current passing through the coil, the driving force in the peripheral position will be lower than that in the vicinity of the center of stroke, resulting in a lowering of the ability to follow position control. In this embodiment of the invention, therefore, the decrease in the driving force in the peripheral position is going to be reduced by operation with the correction coefficient. FIG. 15 shows driving force characteristics after correction corresponding to the relative position. If the driving force is applied to the VCM 206 with such driving force characteristics, it is then possible to improve the ability to follow position control even in the peripheral position of the moving portion 30.

The correction coefficient produced out to the correction portion 307 is acquired in the acquisition portion 301 based on the first deviation produced out from the operation portion 203; in the acquisition portion 301, however, there is the correction coefficient acquired on the basis of a table having the first deviation and the correction coefficient stored in a correlated manner. Stored in that table is the correction coefficient for reducing the driving force decreases caused by a variety of factors. Note here that the correction coefficient may be figured out by implementing given operation with respect to the first deviation instead of using that table.

While reference has been made to the uniaxial control setup for the image shake corrector, it is understood that especially if the driving force applied to the voice coil motor is corrected on the basis of the first deviation of the drive target position from the reference position, it is then possible to reduce the driving force decreases occurring in the peripheral region or the like, resulting in improvements in the ability to follow position control.

How to implement position control in the case where the moving portion 30 explained with reference to FIGS. 1 to 8 is moved in two directions will now be explained with reference to the accompanying drawings. FIG. 16 is illustrative of magnetic flux densities in association with the movement of the coil. As is the case with FIGS. 1 to 8, magnet portions A and B are located asymmetrically about the center of stroke in the X-direction. In each graph, the solid line is indicative of a magnetic flux density change that occurs as the coil moves from a position A in the X- and Y-directions, respectively. When the coil is moved from a position B in the X-direction wherein the position B is displaced from the position A in the Y-direction, the magnetic flux decreases largely in association with the rightward movement of the coil as indicated by a dotted line. When the coil is moved from a position C in the Y-direction where the position C is displaced from the position A in the X-direction, on the other hand, the magnetic flux shows such characteristics as indicated by a one-dotted line. Thus, when the coil is moved in both the X- and Y-directions, there is a change in the magnetic flux received by the coil in the respective positions of movement.

Figure 17:
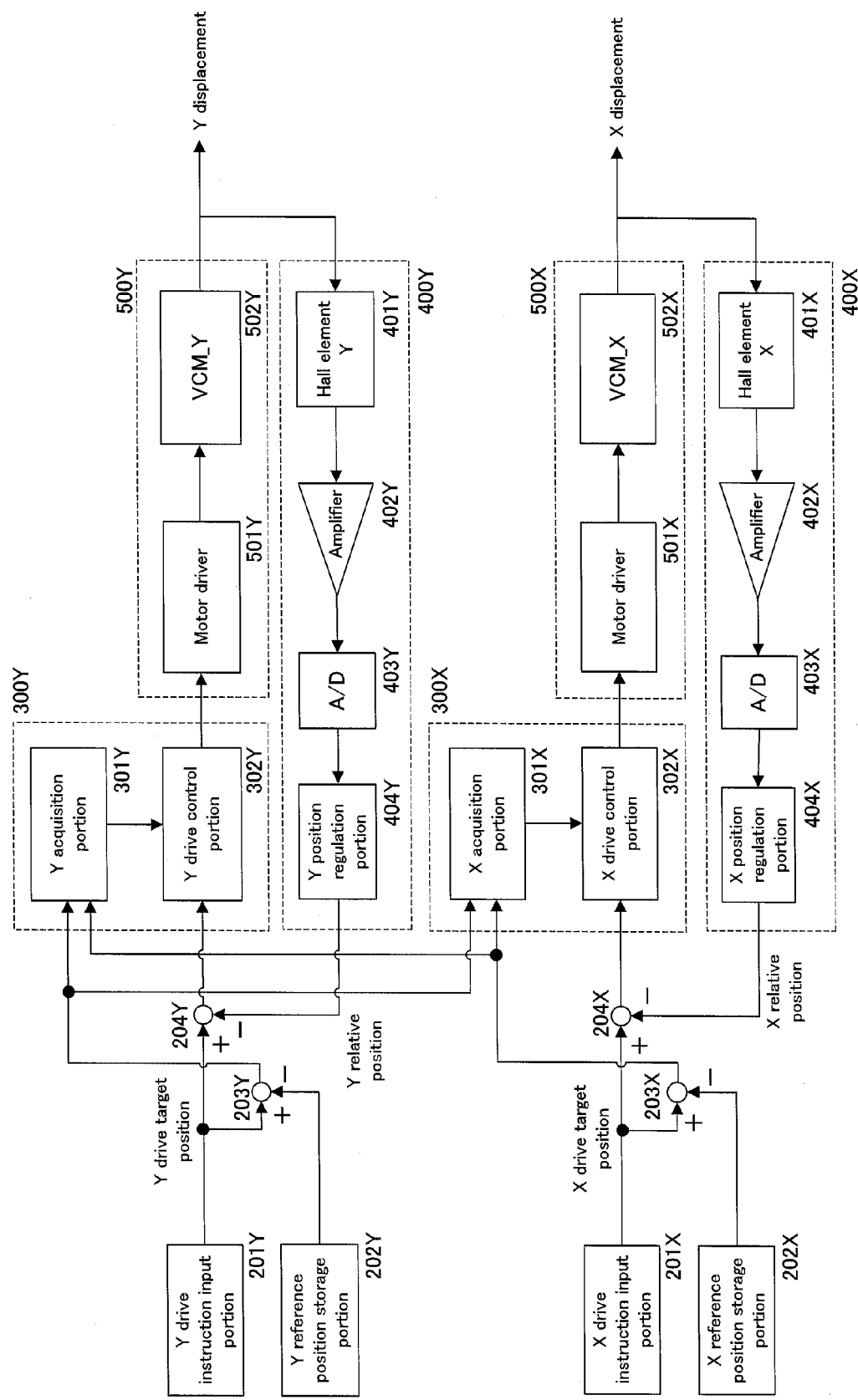
FIG. 17 is a block diagram of the control setup of the image shake corrector (biaxial control).

FIG. 17 is illustrative of the correction setup for the image shake corrector wherein biaxial control is implemented. Such a biaxial control setup is made up of, and includes, control blocks 201X to 502X for implementing movement control with respect to the X-axis direction and control blocks 201Y to 502Y for implementing movement control with respect to the Y-axis direction. The basic control operation of the control blocks in each direction will not be explained anymore because of being the same as explained with reference to FIG. 13. In such biaxial control, even with the movement of the coil in the same X-axis direction, the amount of correction of the driving force will differ depending on the position of the coil in the Y-axis direction as can be seen from FIG. 16. In other words, each control portion 300X, 300Y is operable to acquire the correction coefficient using not only the first deviation for its own control block but also the first deviation for other control blocks.

For instance, when it comes to the control blocks 201X to 502X for implementing movement control in the X-axis direction, the correction coefficient is acquired on the basis of the X-direction first deviation produced out from the operation block 203X and the Y-direction first deviation produced out from the operation block 203Y. In the X acquisition portion 301, therefore, the correction efficient is acquired using a table wherein the first deviations about both the X- and Y-directions are correlated to the correction coefficient. Alternatively, the correction coefficient may be acquired by implementing given operation with respect to the two first deviations about both the X- and Y-directions.

The same holds true for the control blocks 201Y to 502Y with respect to the X-axis direction: the Y-acquisition portion 301Y is operable to acquire the correction coefficient using not only the Y-direction first deviation produced out from one operation portion 203Y but also the X-direction first deviation produced out from other operation portion 203X and use it for the correction of the driving force. The correction coefficient acquired at the X- and Y-acquisition portions 301X and 301Y are entered into the X- and Y-drive control portions 302X and 302Y for use for calculating out the driving forces in both the X- and Y-directions. Control of the X- and Y-drive control portions 301X and 301Y may be implemented by the control setup shown in FIG. 14.

Not only such a biaxial setup but also a multiaxial setup for implementing position correction with respect to three or more directions may be used with the image shake corrector. In that case, each control block in charge of movement in each axis direction is operable to use the first deviation of its own axis as well as the first deviation entered from the control block in charge of movement in other axial direction thereby implementing driving force control.

Figure 18:
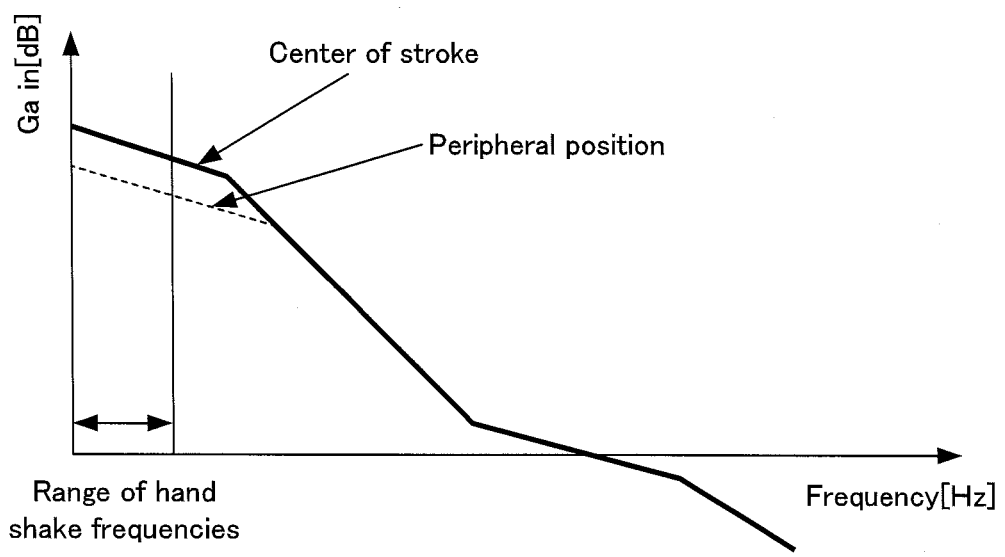
FIG. 18 is indicative of the open loop gain frequency characteristic of the feedback control system performed with the image shake corrector 1, according to one embodiment of the invention, under the conditions before improving the influence of the load by a flexible cable.

In this conjunction, when feedback control is implemented with the image shake corrector 1 to which such flexible cable 34 as explained with reference to FIG. 12 is connected, there may often be a lowering of frequency characteristics in a peripheral position of stroke as the moving portion is moved by the energizing force of the flexible cable 34. FIG. 18 is a graph indicative of the open loop gain frequency characteristics in the feedback control performed with the image shake corrector 1, wherein the solid line is indicative of frequency characteristics in the vicinity of the center of stroke and the broken line is indicative of frequency characteristics in the peripheral position of stroke. The energizing force of the flexible cable 34 gives rise to a lowering of the gain of frequency characteristics in the peripheral position and in the range of hand shake frequencies, as can be seen from this graph.

Figure 19:
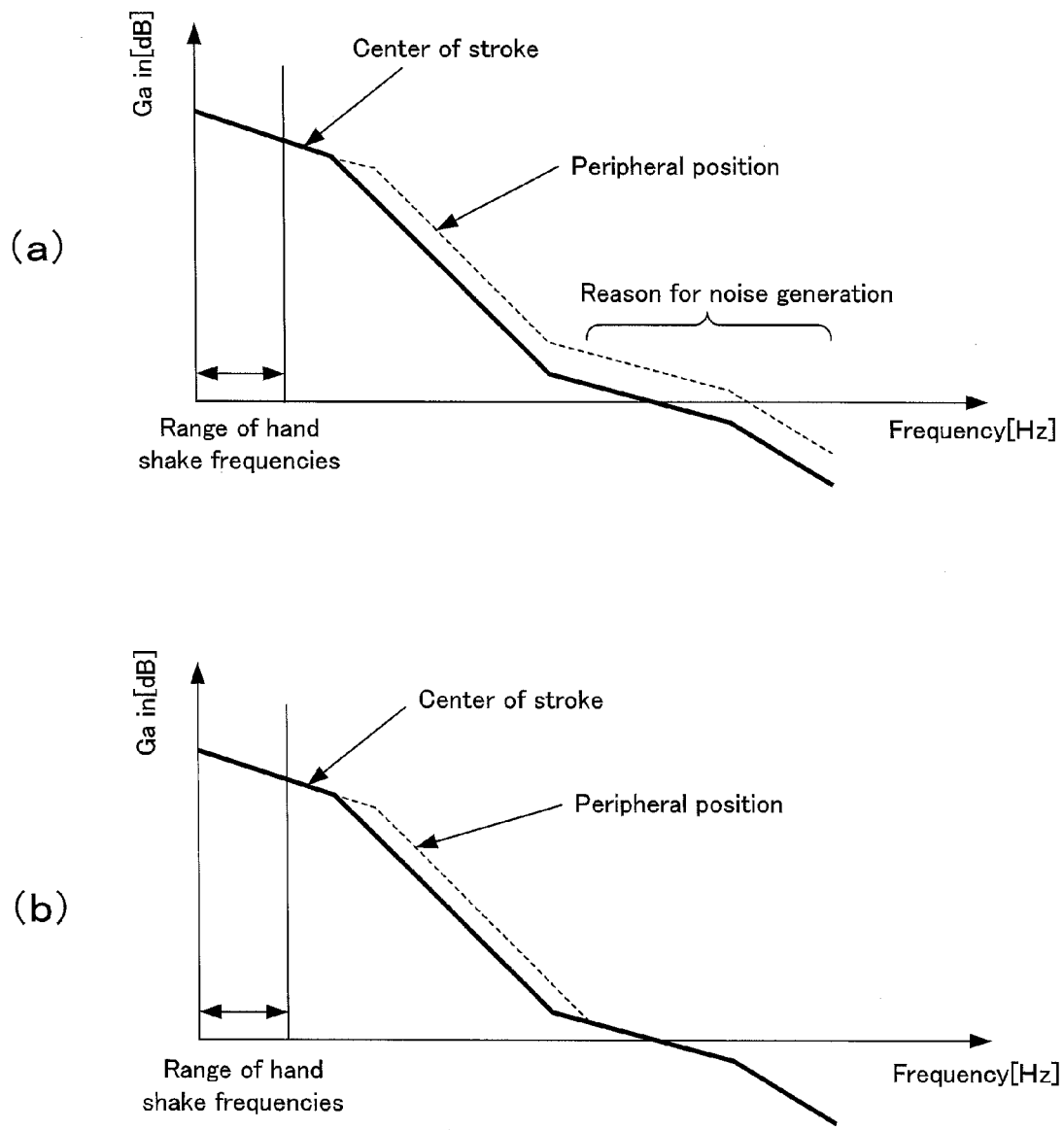
FIG. 19 is indicative of the open loop gain frequency characteristic of the feedback control system performed with the image shake corrector 1 according to one embodiment of the invention, under the conditions after improving the influence of the load by a flexible cable.

FIG. 19 is illustrative of one example of how such insufficient gain of the open loop gain frequency characteristics is compensated for. In the correction of the driving force explained with reference to FIG. 14, the correction coefficient is supposed to be figured out with respect to the whole of proportional operation 303, integral operation 304 and differential operation 305. One possible approach to covering the gain shortage in the peripheral area is to make the correction coefficient in the peripheral area large. FIG. 19($a$) is indicative of the open loop gain frequency characteristics in which the correction coefficient in the peripheral position is so increased in the drive control portion 302 that the gain shortage is covered in the range of hand shake frequencies. As shown, the whole frequency characteristics are boosted up in the case of correction of the driving force of FIG. 14, resulting in the boosting of high-frequency components attributable to the generation of noises too. Accordingly, driving noises will grow more during the operation of the image shake corrector 1.

Figure 20:
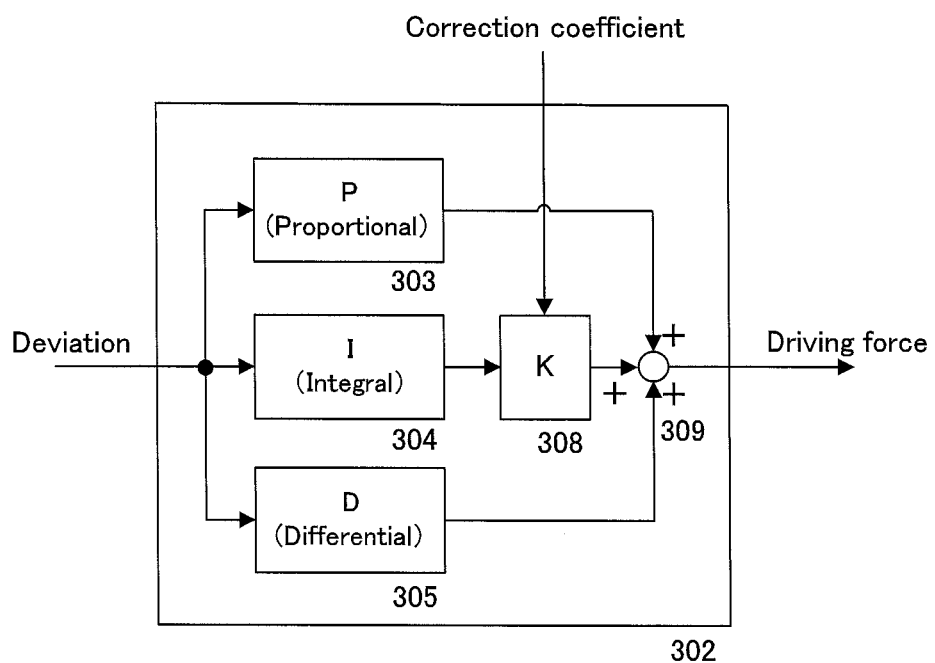
FIG. 20 is a block diagram of the control setup of the control component 300.

In this embodiment of the invention, the correction of the driving force in the peripheral position is implemented with respect to low-frequency components to prevent driving noises from growing more and improve response characteristics in the peripheral position. FIG. 20 is illustrative of the control setup of a control portion 300 according to another embodiment of the invention. In this control portion 300, a correction portion 308 is supposed to figure out a correction coefficient with respect to integral operation. In an operation portion 309, proportional operation 303, integral operation 305 and integral operation 304 corrected in the correction portion 308 are operated to figure out the driving force. FIG. 19($b$) is indicative of frequency characteristics in the control portion 300 of FIG. 20. As compared with FIG. 19($a$), gain improvements in the frequency band attributable to the generation of noises are more held back.

It is here to be noted that the control setup of the control portion 300 may be built up of two correction portions 307 and 308. In other words, an acquisition portion 301 is supposed to acquire the first correction coefficient with respect to the whole of proportional operation 303, integral operation 304 and differential operation 305 and the second correction coefficient with respect to integral operation 304 and make correction for the driving force using two such correction coefficients. According to such an embodiment, it is possible to reduce operating noises and make further improvements in the ability to follow control operation.

Figure 21:
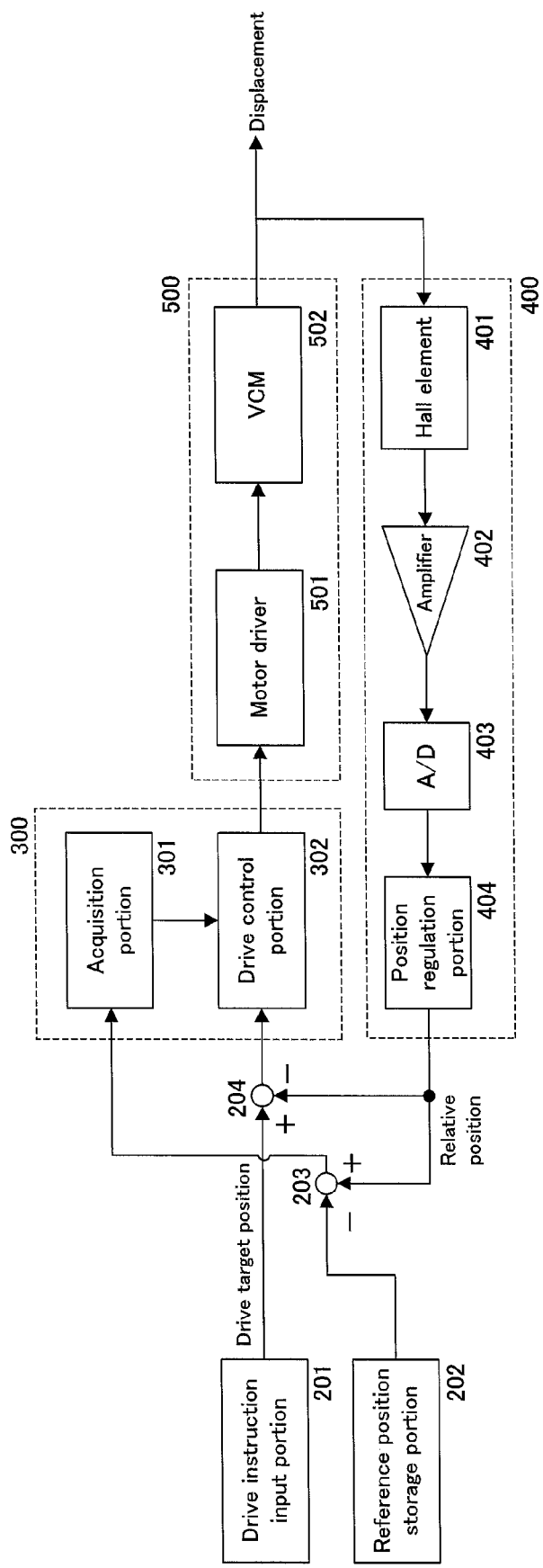
FIG. 21 is a block diagram of the control setup of the image shake corrector (uniaxial control).

While the arrangement of FIGS. 13 and 17 is supposed to obtain the correction coefficient on the basis of the deviation (first deviation) of the drive target position from the reference position, it is to be understood that the correction coefficient may be obtained in other embodiments. FIG. 21 is a block diagram illustrative of the control setup of the image shake corrector according to other arrangement (uniaxial control), and FIG. 22 is a block diagram illustrative of the control setup of the image shake corrector according to yet other arrangement (biaxial control).

Figure 22:
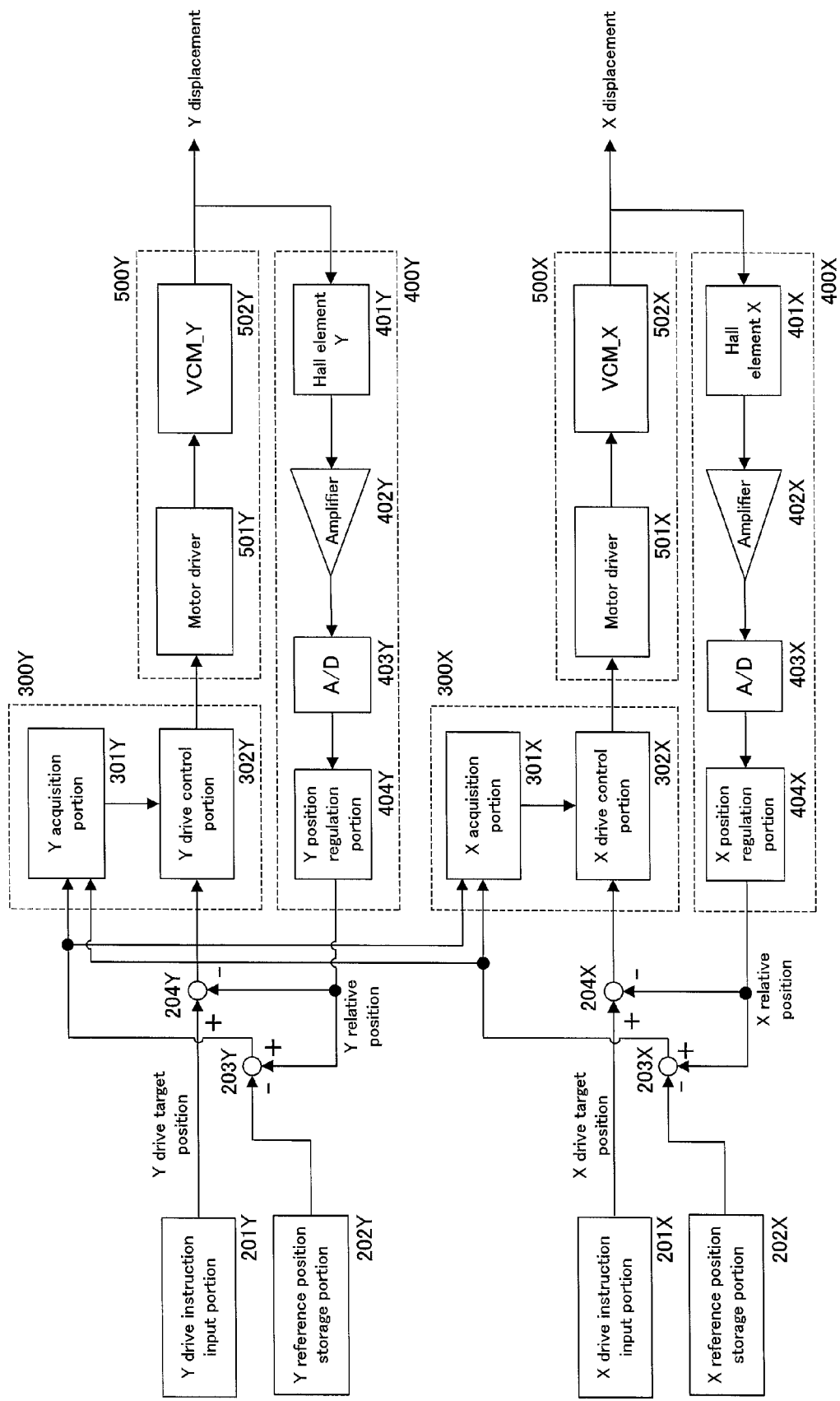
FIG. 22 is a block diagram of the control setup of the image shake corrector (biaxial control).

The arrangement shown in FIGS. 21 and 22 is different from the arrangement of FIGS. 13 and 17 in that the deviation from the drive target position from the reference position is defined as the first deviation in the latter arrangement, whereas the deviation of the relative position produced out from a position detection portion 400 from the reference position is defined as the first deviation in the former arrangement. Even with such an arrangement, the driving force is corrected on the basis of the correction coefficient acquired on the basis of the first deviation thereby making improvements in the ability of the image shake corrector to follow control operation.

The image shake corrector according to this embodiment of the invention may be used on electronic imaging apparatus, inter alia, digital cameras and video cameras, as will be exemplified just below.

Figure 23:
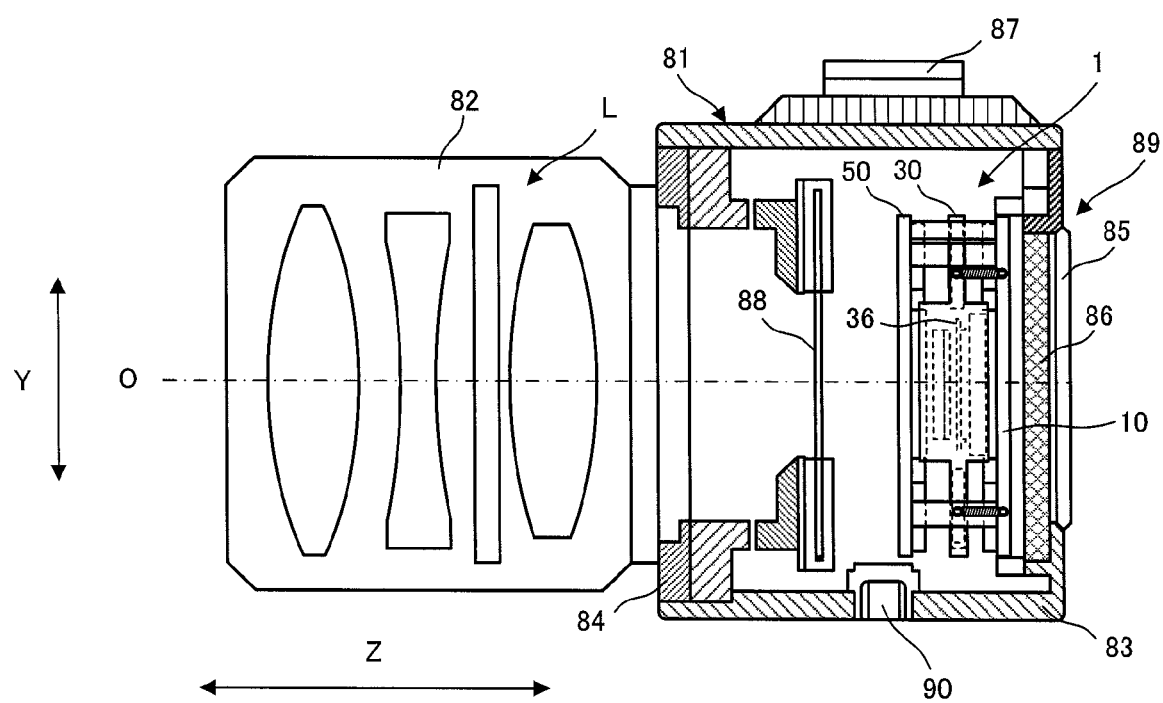
FIG. 23 is illustrative of an imaging apparatus (digital camera) having the image shake corrector according to one embodiment of the invention.
Figure 24:
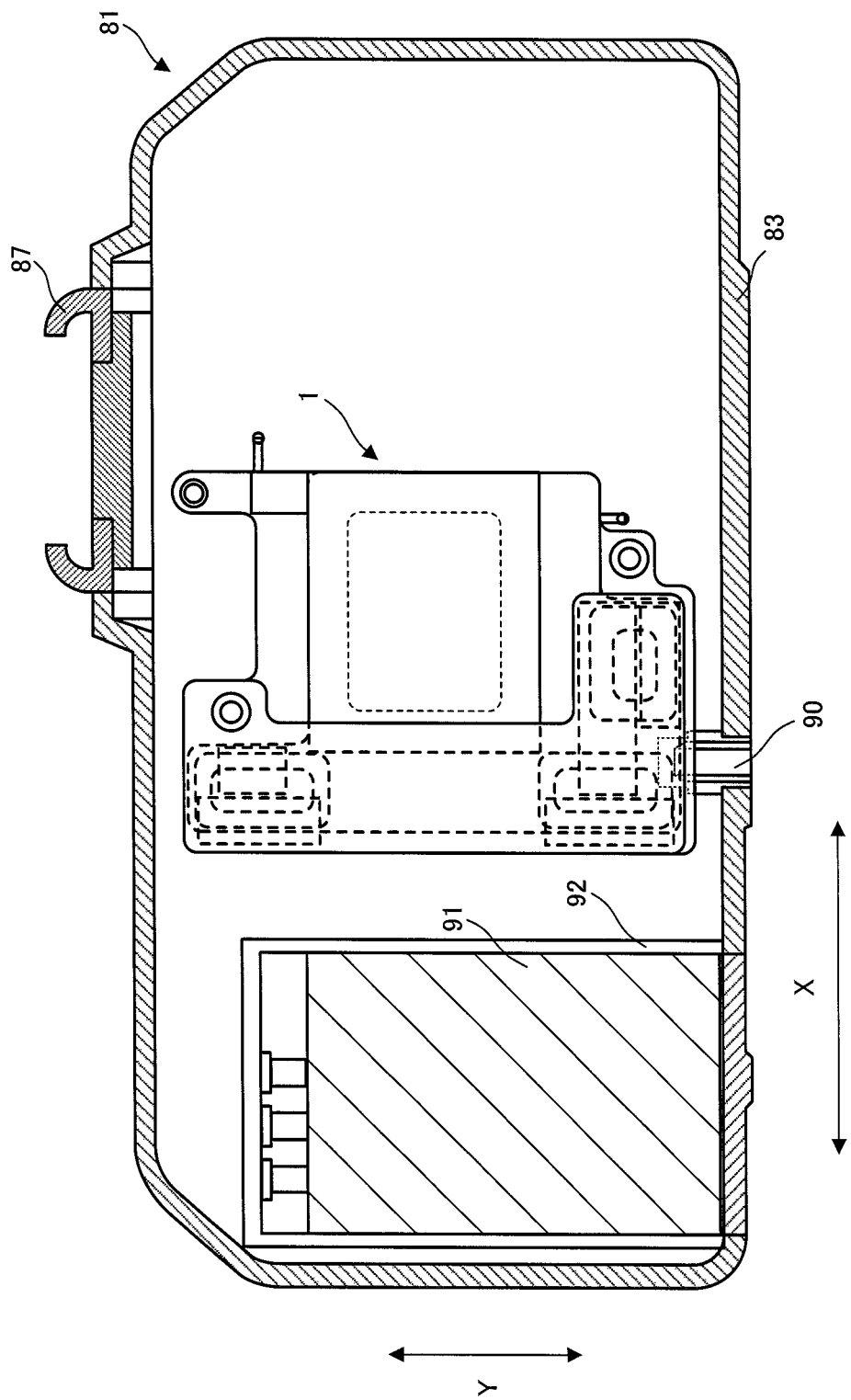
FIG. 24 is illustrative of the image shake corrector and so on in an imaging apparatus (digital camera).

FIG. 23 is illustrative of an imaging apparatus including the image shake corrector according to this embodiment of the invention, and FIG. 24 is illustrative of the image shake corrector and the like in the imaging apparatus. A digital camera 80 operating as the imaging apparatus including the image shake corrector 1 according to one embodiment of the invention is built up of a camera body 81 and a lens unit 82 comprising a taking lens L interchangeably attached to the camera body 81, as shown in FIGS. 23 and 24.

In what follows, an axis of light incident from the taking lens L on the camera body 81 is indicated by ○, and an object side with respect to the optical axis ○ direction is defined as forward (front side) while an imaging side is defined as backward (back side). Of the directions orthogonal to the optical axis ○, the left-and-right direction as viewed from forward in an ordinary taking state is defined as the X-direction that is the first direction, and the vertical direction is defined as the Y-direction that is the second direction. The X-direction that is the first direction and the Y-direction that is the second direction correspond to the X- and Y-directions that are the first and second directions with respect to the image shake corrector 1.

The camera body 81 comprises an outer casing 83 that serves also as a camera proper for encasing members forming the digital camera 80 in it, and further includes a ring-like mount 84 for interchangeably attaching the lens unit 82 to a front position on the optical axis O. The outer casing 83 is also provided with a grip (not shown) that is positioned leftward as viewed from forward and held by the right hand of an operator as images are taken. Located on top of this grip are a variety of switches and buttons such as a release button.

The camera body 81 further comprises a battery chamber 92 within the outer casing 83 for receiving batteries 91 in it, and in the rear of the battery chamber 92 there is a circuit board (not shown) and the like located, said circuit board having on it control circuits for implementing control over the camera, image processing, compression processing, data storage processing and the like, an SDRAM or other memory, a power source circuit, etc. Further, the camera body 81 has a built-in gyro-sensor (not shown) for detecting shaking of the camera body 81.

To add to this, the camera body 81 comprises a liquid crystal panel 86 on the back side of the outer casing 83, which panel includes a panel display window 85, as shown in FIGS. 23 and 24. This liquid crystal panel 86 is a TFT (thin-film transistor) type of rectangular display panel that displays as images a variety of information such as settings and events in addition to the taken images. On top of the outer casing 83 there is a hot shoe 87 located for attachment of an optical finder, an electronic view finder, an outward flash, a microphone, and such.

Within the outer casing 83 of the camera body 81 there are a focal plane shutter 88 and an imaging unit 89 located as shown in FIG. 23. The imaging unit 89 comprises the image shake prevention apparatus 1 that supports an imaging device 36 such as a CCD or CMOS sensor on the XY plane in a displaceable manner, with a voice coil motor used as an actuator. This image shake prevention apparatus 1 operates such that the detected shaking-direction force is cancelled out on the basis of a signal from a shake detector. The imaging device 36 has a rectangular light-reception surface whose long side lies along the X-direction, and the outer casing 83 is provided on its bottom surface with a threaded portion 90 for receiving a tripod.

Figure 25:
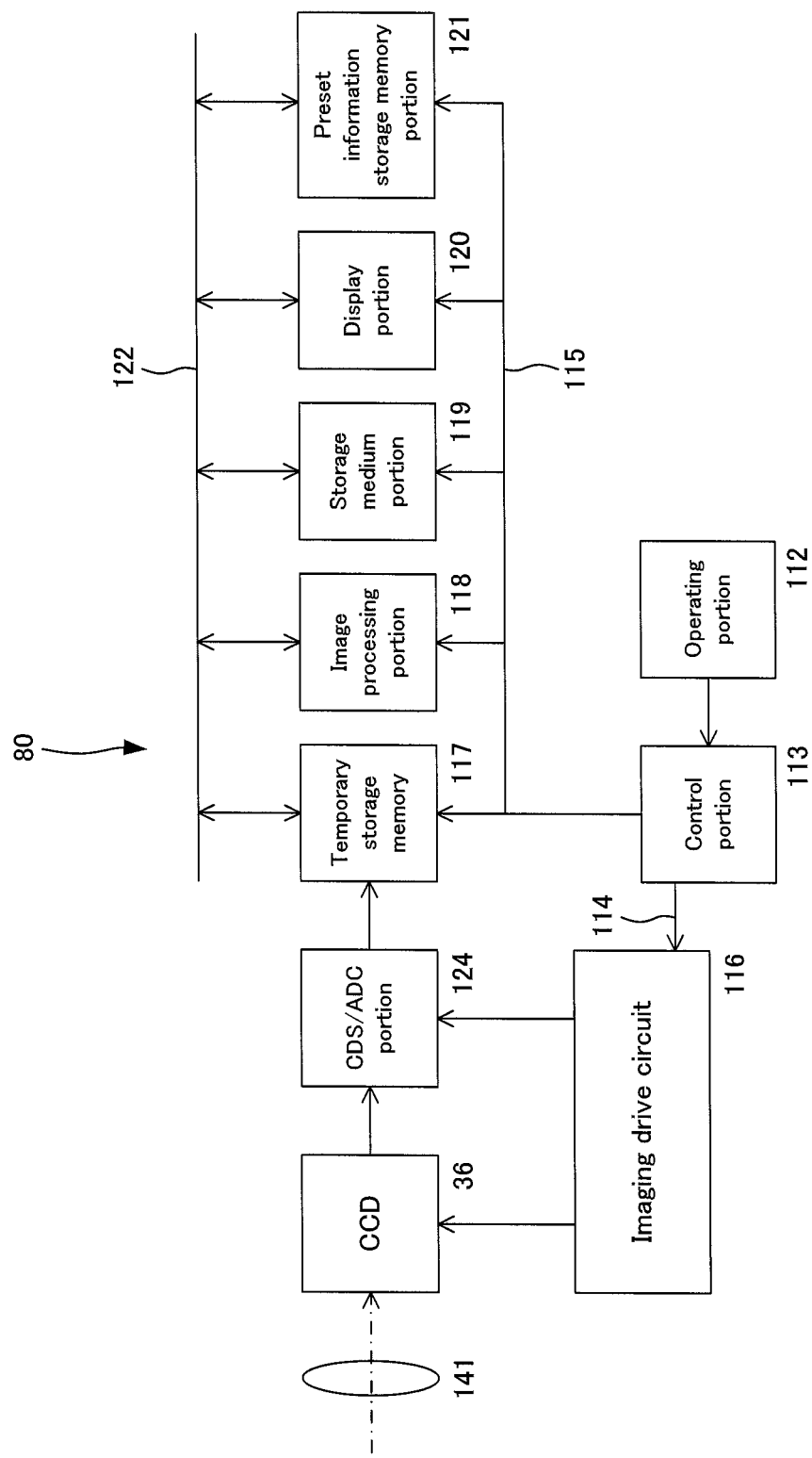
FIG. 25 is a block diagram of the control setup of the imaging apparatus (digital camera) according to one embodiment of the invention.

FIG. 25 is a block diagram illustrative of the internal circuits of a main portion of the digital camera 80 according to one embodiment of the invention. Note here that in the following explanation, processing means are typically made up of a CDS/ADC portion 124, a temporal storage memory 117 and an image processing portion 118, and a storage means is typically made up of a storage medium.

As shown in FIG. 25, the digital camera 80 includes an operating portion 112, a control portion 113 connected to the operating portion 112, an imaging drive circuit 116 and a temporal storage memory 117 connected to the control signal output port of the control portion 113 via buses 114 and 115, an image processing portion 118, a storage medium portion 119, a display portion 120, and a preset information storage memory portion 121.

The temporal storage memory 117, image processing portion 118, storage medium portion 119, display portion 120 and preset storage memory portion 121 are designed such that data are mutually entered in or produced out from them via a bus 122, and the imaging drive circuit 116 is connected with the imaging device 36 and CDS/ADC portion 124.

The operating portion 112 includes various input buttons and switches, through which event information entered (by a camera operator) from outside is notified to the control portion 113. The control portion 113 is a central computing unit that is made up of typically a CPU and has a built-in program memory (not shown): according to the program loaded in that program memory, it has control over the digital camera 80.

The CCD 36 is an imaging device that is driven and controlled by the imaging drive circuit 116, and converts or transforms light quantity per pixel of the object image formed through the imaging optical system 141 into electric signals that are in turn sent out to the CDS/ADC portion 124.

The CDS/ADC portion 124 is a circuit that amplifies electrical signals entered from the imaging device 36 and subjects them to analog-to-digital conversion so that image raw data (Bayer data: hereinafter called the RAW data) subjected only to amplification and digital conversion are sent out to the temporal storage memory 117.

The temporal storage memory 117 is a buffer made up of typically an SDRAM: it is a memory device for temporal storage of the RAW data produced out from the CDS/ADC portion 124. The image processing portion 118 is a circuit that reads out the RAW data stored in the temporal storage memory 117 or the RAW data stored in the storage medium portion 119 thereby electrically implementing various forms of processing including distortion correction, based on an image quality parameter instructed by the control portion 113.

The storage medium portion 119 detachably receives a card type or stick type recording medium comprising typically a flash memory so that the RAW data transferred from the temporal storage memory 117 or image data processed at the image processing portion 118 are recorded and held in that flash memory.

The display portion 120 includes a liquid crystal display monitor or the like to display the taken RAW data or image data, operating menus or the like on it. The preset information storage memory portion 121 includes a ROM portion having various image quality parameters previously loaded in it, and a RAM portion for storing an image quality parameter read out from that ROM portion by entering operation of the operating portion 112.

The inventive image shake corrector may be used with the thus assembled digital camera 80 thereby achieving a small-format imaging apparatus well fit for taking moving images.

While the inventive position control system has been described typically with reference to the image shake corrector 1 used on an imaging apparatus, it is to be understood that the present invention is not limited to such image shake corrector 1; so it may be applied to a variety of apparatus having a part movable by energization of driving force.

It is here to be understood that the present invention is not limited to these embodiments alone, and some embodiments comprising optional combinations thereof are to be included in the category of the invention.

The invention claimed is:

1. A position control system comprising:
   a fixed portion,
   a moving portion that is relatively movable with respect to said fixed portion,
   a position-detection portion that detects a position of said moving portion with respect to a reference position of said fixed portion,
   a drive portion that applies driving force to said moving portion thereby moving said moving portion, a control portion that controls the driving force of said drive portion, an input portion for inputting a drive target position to operation portions for said moving portion, and the operation portions operate a first deviation that is a difference between the drive target position and said reference position and a second deviation that is a difference between a position detected by said position-detection portion and the drive target position, wherein:

said control portion is operable to determine the driving force to be applied to said drive portion based on a correction coefficient acquired based on said first deviation and said second deviation.

2. The position control system as recited in claim 1, which comprises a plurality of sets, each including said position-detection portion, said drive portion, said control portion, said input portion, and said operation portions wherein said control portion in a certain set is operable to acquire said correction coefficient based on said first deviation for its own set and a first deviation for other set.

3. The position control system as recited in claim 1, wherein said drive portion includes a voice coil motor comprising a magnet portion and a coil.

4. The position control system as recited in claim 1, which further comprises a flexible cable connected to said moving portion, wherein:

said control portion is operable to acquire said correction coefficient based on driving force characteristics having force energized by said flexible cable taken into account.

5. The position control system as recited in claim 1, wherein said control portion executes PID control including proportional operation, integral operation and differential operation, and said correction coefficient is operated with respect to results of proportional operation, integral operation and differential operation.

6. The position control system as recited in claim 1, wherein said control portion executes PID control including proportional operation, integral operation and differential operation, and said correction operation is operated with respect to results of integral operation.

7. The position control system as recited in claim 3, wherein:

a magnetic flux density generated from said magnet portion is asymmetric with respect to said reference position in a direction of said movement, and said control portion is operable to acquire said correction coefficient based on driving force characteristics having asymmetry of said magnetic flux density taken into account.

8. A position control system comprising:
a fixed portion,
a moving portion that is relatively movable with respect to said fixed portion, a position-detection portion that detects a position of said moving portion with respect to a reference position of said fixed portion, a drive portion that applies driving force to said moving portion thereby moving said moving portion, a control portion that controls the driving force of said drive portion, and an input portion for inputting a drive target position for said moving portion, wherein:

said control portion is operable to determine the driving force to be applied to said drive portion based on a correction coefficient acquired based on a first deviation that is a difference between a position detected by said position-detection portion and said reference position, and a second deviation that is a difference between the position detected by said position-detection portion and the drive target position inputted into said input portion.

9. The position control system as recited in claim 8, which comprises a plurality of sets, each including said position-detection portion, said drive portion, said control portion, and said input portion, wherein said control portion in a certain set is operable to acquire said correction coefficient based on said first deviation for its own set and a first deviation for other set.

10. The position control system as recited in claim 8, wherein said drive portion includes a voice coil motor comprising a magnet portion and a coil.

11. The position control system as recited in claim 8, which further comprises a flexible cable connected to said moving portion, wherein:

said control portion is operable to acquire said correction coefficient based on driving force characteristics having force energized by said flexible cable taken into account.

12. The position control system as recited in claim 8, wherein said control portion executes PID control including proportional operation, integral operation and differential operation, and said correction coefficient is operated with respect to results of proportional operation, integral operation and differential operation.

13. The position control system as recited in claim 8, wherein said control portion executes PID control including proportional operation, integral operation and differential operation, and said correction operation is operated with respect to results of integral operation.

14. The position control system as recited in claim 10, wherein:

a magnetic flux density generated from said magnet portion is asymmetric with respect to said reference position in a direction of said movement, and said control portion is operable to acquire said correction coefficient based on driving force characteristics having asymmetry of said magnetic flux density taken into account.

* * * * *